Nov. 15, 1955  G. W. WILLARD  2,723,556
ULTRASONIC VELOCITY MEASURING DEVICE
Filed March 31, 1950  10 Sheets-Sheet 1

FIG. I

INVENTOR
G. W. WILLARD
BY
Franklin Mohr
ATTORNEY

Nov. 15, 1955
G. W. WILLARD
2,723,556
ULTRASONIC VELOCITY MEASURING DEVICE
Filed March 31, 1950
10 Sheets-Sheet 3
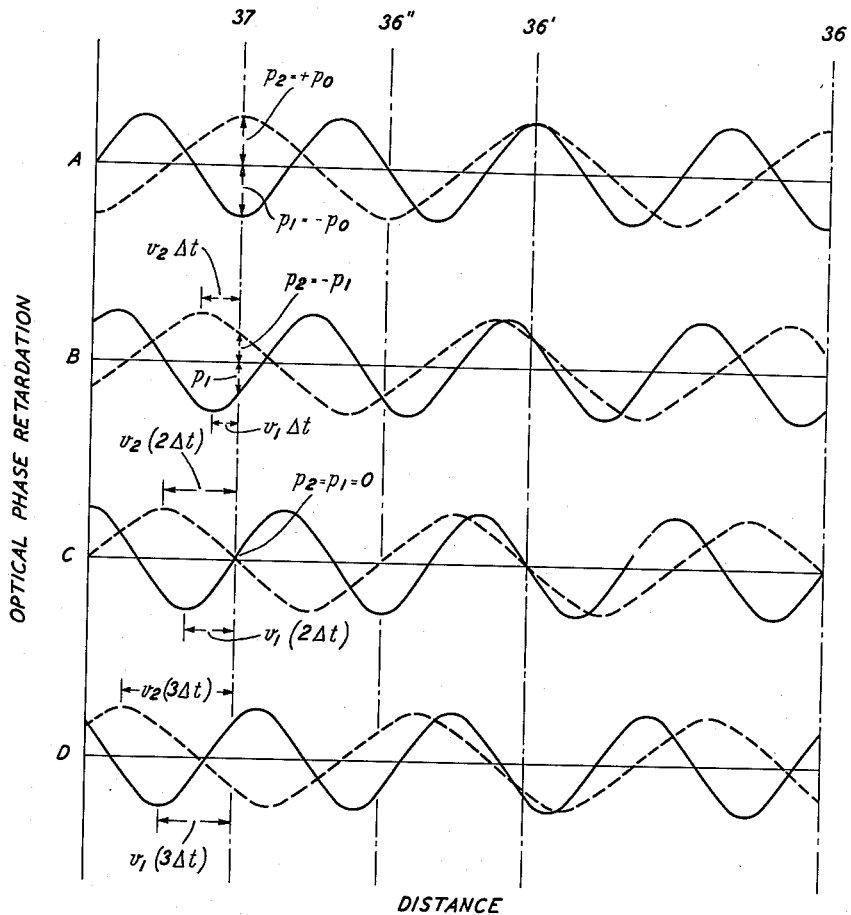
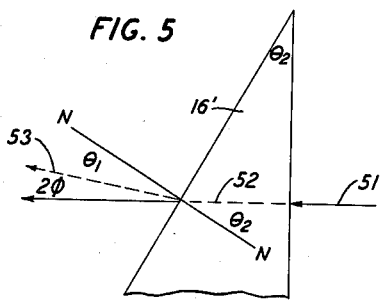
INVENTOR
G. W. WILLARD
BY
Franklin Mohr
ATTORNEY Nov. 15, 1955   G. W. WILLARD   2,723,556
ULTRASONIC VELOCITY MEASURING DEVICE
Filed March 31, 1950   10 Sheets-Sheet 5

INVENTOR
G. W. WILLARD
BY
Franklin Mohr
ATTORNEY

Nov. 15, 1955  G. W. WILLARD  2,723,556
ULTRASONIC VELOCITY MEASURING DEVICE
Filed March 31, 1950  10 Sheets-Sheet 6

INVENTOR
G.W. WILLARD
BY
Franklin Mohr
ATTORNEY

Nov. 15, 1955  G. W. WILLARD  2,723,556
ULTRASONIC VELOCITY MEASURING DEVICE
Filed March 31, 1950  10 Sheets-Sheet 7
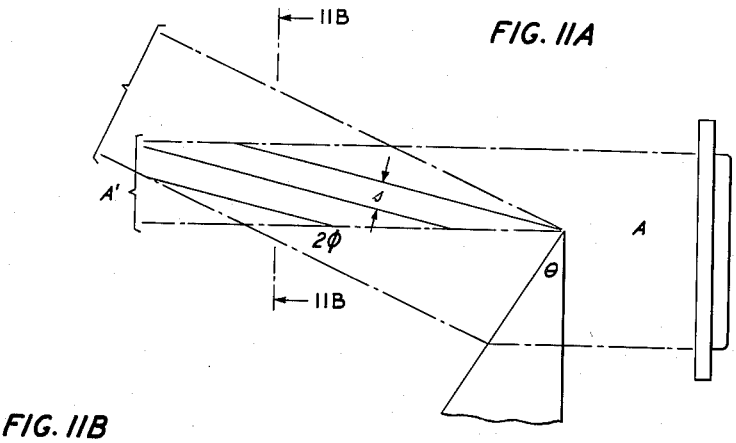
FIG. 11A
FIG. 11B
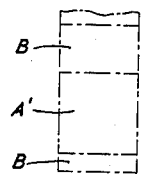
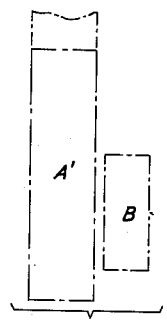
FIG. 12B
FIG. 12A
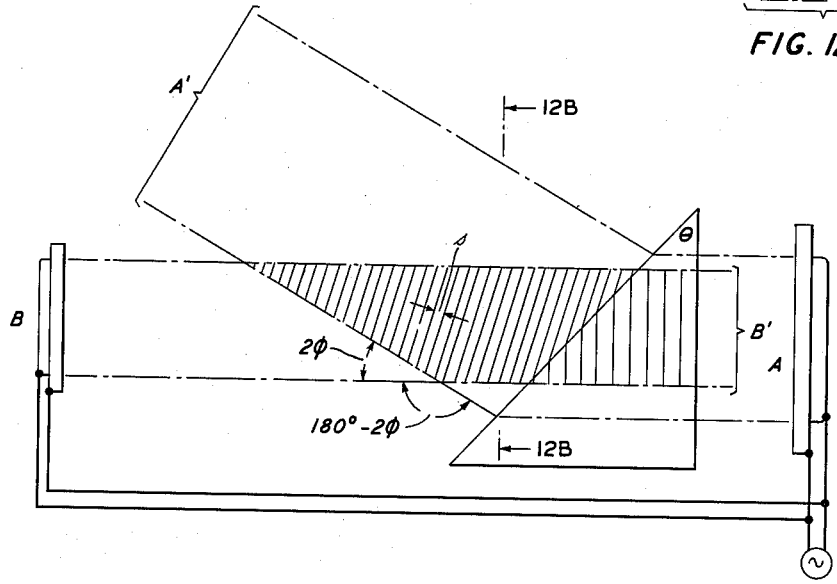
INVENTOR
G. W. WILLARD
BY
Franklin Mohr
ATTORNEY Nov. 15, 1955 — G. W. WILLARD — 2,723,556
ULTRASONIC VELOCITY MEASURING DEVICE
Filed March 31, 1950 — 10 Sheets-Sheet 8

INVENTOR
G. W. WILLARD
BY
Franklin Mohr
ATTORNEY

Nov. 15, 1955  G. W. WILLARD  2,723,556
ULTRASONIC VELOCITY MEASURING DEVICE
Filed March 31, 1950  10 Sheets—Sheet 9
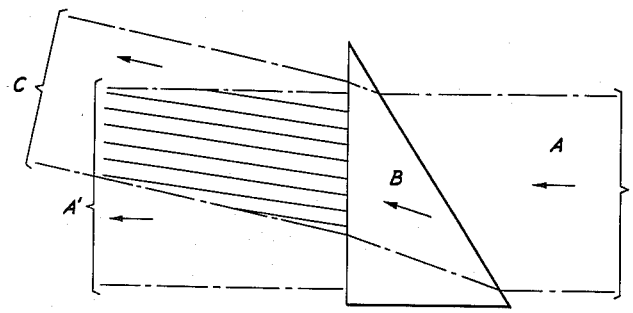
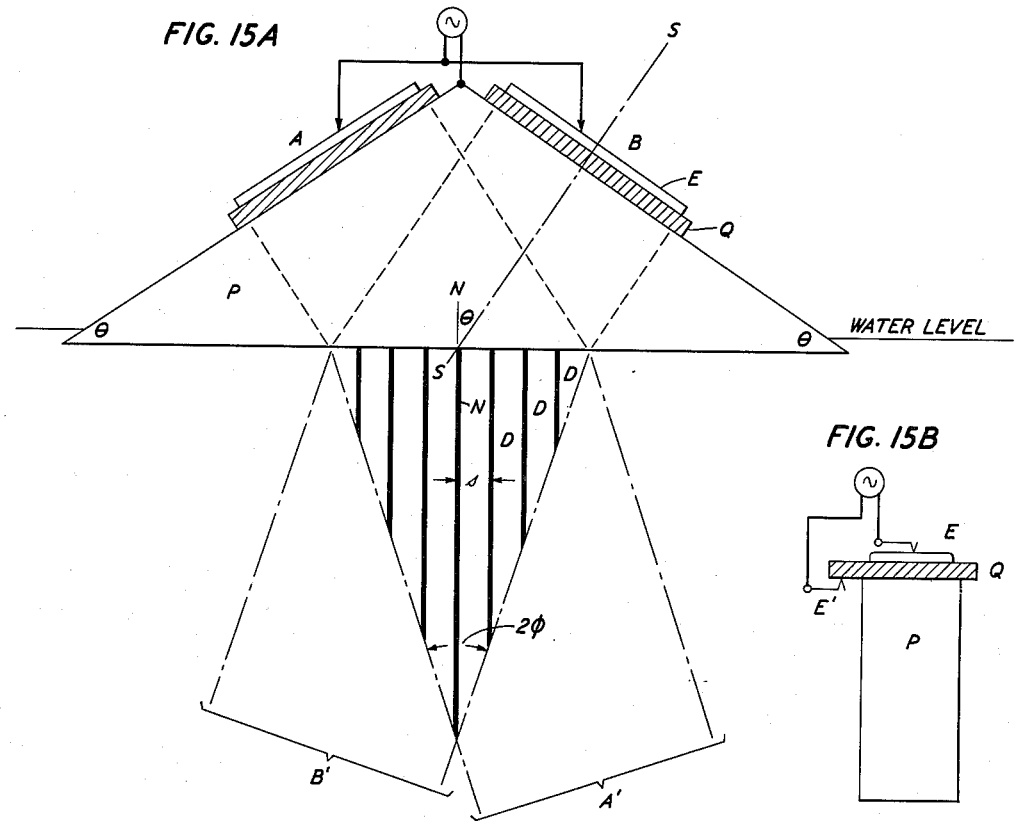
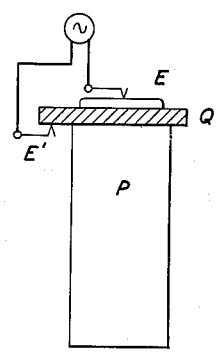
INVENTOR
G. W. WILLARD
BY
Franklin Mohr
ATTORNEY Nov. 15, 1955  G. W. WILLARD  2,723,556
ULTRASONIC VELOCITY MEASURING DEVICE
Filed March 31, 1950  10 Sheets-Sheet 10

INVENTOR
G. W. WILLARD
BY
Franklin Mohr
ATTORNEY

United States Patent Office 2,723,556
Patented Nov. 15, 1955

2,723,556

ULTRASONIC VELOCITY MEASURING DEVICE

Gerald W. Willard, Fanwood, N. J., assignor to Bell Telephone Laboratories, Incorporated, New York, N. Y., a corporation of New York Application March 31, 1950, Serial No. 153,258

21 Claims. (Cl. 73—67)

This invention relates to means and arrangements for measuring and comparing wave propagation velocities in different media, and more particularly to arrangements for measuring ultrasonic velocities in solids or fluids, with the aid of optical or other indicating means, and making use of a reference velocity in a transparent medium, regardless of whether the medium in which the velocity is to be ascertained is transparent, translucent, or opaque to light.

It is known to use an ultrasonic light-diffraction optical system in velocity measurements of transparent liquids, the velocity being derived from measurements of the spacing of spectral lines in the light-diffraction spectra. Such measurements have been described by this applicant in the Journal of the Acoustical Society of America, volume 12, pages 438 through 448, January 1941.

Wherever the term "sound" is used herein it is to be understood that it relates to mechanical vibrational waves in general, and particularly but not necessarily exclusively to waves of this kind in the ultrasonic range.

In the case of solids, whether opaque or not, and of opaque materials generally, difficulty has been experienced in applying the above or other known methods. Measurement of the deviation angle of a prism or of the focal length of a lens from which to derive the velocity of wave propagation in the refracting body yields values of velocity of relatively low accuracy. Measurement of the acoustic wavelength in solids by observing the optical spectral spacings, as for liquids, or by the standing wave striation method requires the use of a specimen of high optical perfection. Even with such specimens the optical effects are weak compared to the same in liquids, because the optical retardation is inversely proportional to the cube of the velocity. Hence more intense sound beams are required and this may result in undue heating of the specimen, especially in plastics where the attenuation is large. Cooling of the specimen by means of circulation of the material, available in fluids, is, of course, out of the question in the case of solids.

In accordance with one manner of practicing the present invention, a specimen of plastic material to be measured is provided in the form of a relatively flat prism. The prism is immersed in water in the tank of an ultrasonic light-diffraction system with a long-edge face parallel to a flat ultrasonic radiator and with the thickness direction of the specimen parallel to the light beam of the system. The sound beam is arranged to be wider than the thickness of the prism so that the sound beam is in effect split into two parts, after reaching the prism, one traveling through the water, generally with a relatively low velocity and short wavelength, and the other through the material of the specimen, generally with a higher velocity and longer wavelength. The sound beam in the water travels on past the prism in normal fashion, while the beam in the plastic is refracted at a face inclined to the incident beam and then travels on through the water at a certain deviation angle with respect to the incident beam, both beams being preferably absorbed in a pad at the far end of the tank to avoid reflected waves and attendant complication and confusion.

The combined optical effect of the two sound beams results in a sound beam picture on the screen of the light-diffraction system, the picture showing an interference pattern comprising a series of uniformly spaced alternate light and dark bands in the part of the picture corresponding to the region in the water where the two sound beams are traveling at an angle to each other. The spacing of the bands is a measure of the velocity in the prism assuming knowledge of the velocity in the water. An interference pattern is visible also in the part of the picture corresponding to the prism if the prism is sufficiently transparent. The spacing of the bands in the region of the prism is different from the spacing of the bands in the region of the two sound beams in the water, and this spacing is also a measure of the relationship of the velocities. When the specimen material is not transparent and no bands are visible within the prism boundary, the spacing of the bands external to the prism will do as well, for there is a one to one correspondence between the bands in the two regions.

In the accompanying drawings:

Fig. 4 is a set of graphs of instantaneous optical phase retardation amplitudes versus distance as would occur in the sound field at successive instants;

Fig. 5 is a diagram of the direction of sound propagation through the prism;

Fig. 11A is a schematic diagram similar to that of Fig. 10A for a specimen prism arranged to divide the incident sound beam along a horizontal line in the figure;

Fig. 11B is a sectional representation of the intersecting sound beams of Fig. 11A;

Fig. 12A is a schematic diagram similar to Fig. 8A for a system in which two individually excited sound beams are employed with a prismatic specimen;

Fig. 12B is a sectional representation of the sound beams of Fig. 12A;

Figs. 14A, 14B and 14C are diagrams useful in explaining the measurement of velocity of transverse mechanical vibrations;

Fig. 15A is a schematic diagram of sound beams and patterns in a system for measurement of transverse velocities or longitudinal velocities employing two sonic radiators;

Fig. 15B is a sectional view with reference to a line S—S in Fig. 15A;

Figure 1:
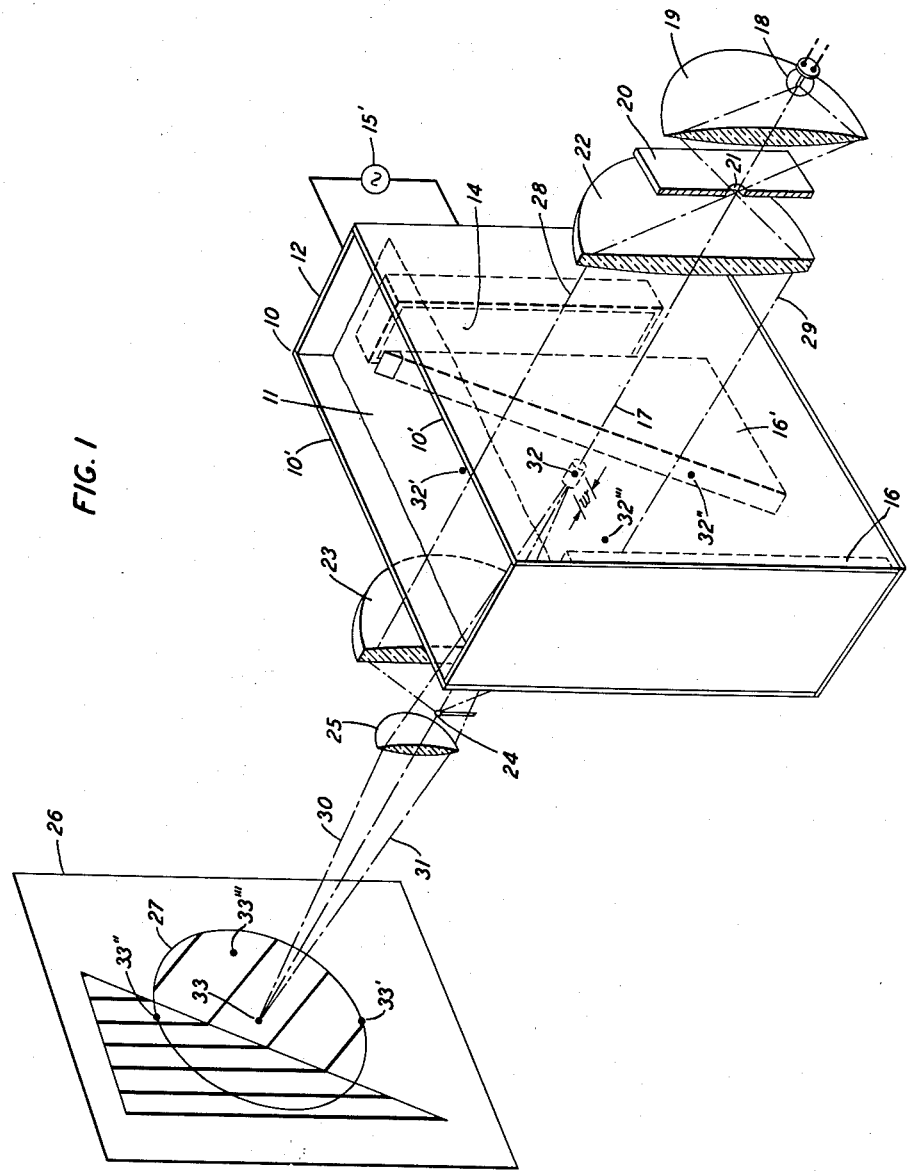
Fig. 1 is an isometric view of the mechanical and optical parts of an arrangement for measuring the sound velocity in a prism of solid material.

Fig. 1 shows the arrangement of the mechanical and optical parts of an equipment for measuring the longitudinal sound velocity in prisms of solid materials. An electrical signal generator 15', of proper known frequency is shown connected to a pair of electrodes 14 and 15 hereinafter more particularly described. The sonic part of the equipment consists of a tank 10 with metal bottom and ends, optical window sides 10', and an open top suitable to a liquid sound transmitting medium 11. In one end wall 12 of the tank 10 which wall may be of thin metal, is mounted an ultrasonic radiator unit 13, 14, 15, for generating plane sound waves in the contiguous liquid medium. The radiator may consist of a rectangular X-cut piezoelectric, quartz plate 13 of suitable thickness to radiate sound waves of the desired frequency; for example, approximately 0.114 mm. thick for 2.5 megacycle sound waves. The inner electrode 14, as well as a suitable mounting means, may be provided by metalizing the full inner face and the edges of the quartz plate 13. A lip 13' may be formed in the wall 12 to surround the metalized edge faces of the quartz plate and the metalized periphery of the plate may be soldered to the lip 13'. An outer electrode 15 may be provided in the form of a flat block of metal, of face dimensions smaller than that of the quartz plate, and lightly pressed against the same by means of a spring (not shown). The signal generator 15' may then be wire-connected between the metal end 12 and electrode 15, the former normally being the ground side. When the quartz plate is energized a sound beam with plane wave fronts parallel to the radiator will be propagated along the length of the tank to the far end. The cross section of the sound beam at the radiator will closely correspond to the area of the outer electrode 15. The sound beam may be entirely absorbed after traversing the tank by a pad 16 of suitable material, for example rubber; or wool, well wet with the liquid 11. A prism specimen 16' cut from the material whose longitudinal sound velocity it is desired to know, may be cut in the form of a 30°–60°–90° triangle, of thickness approximately equal to or greater than half the width of the sound beam, i. e. half the width of electrode 15. The prism 16' is mounted in the tank with its hypotenuse edge face inclined to the radiator surface, its longer-leg edge face near and closely parallel to the radiator face, and so positioned cross-wise in the tank as to intercept approximately one-half of the width of the sound beam. The above angular shape of prism has been chosen here for convenience in explanation but other shapes may be used as well. Similarly the prism has been chosen to be optically transparent, for convenience in explaining the operation of the invention, though it may equally well be opaque, as will be shown hereinafter.

The optical system of Fig. 1 comprises a number of elements all centered along a single optical axis 17, said axis being normal to the windows 10' and parallel to the faces of the radiator 13, and passing centrally through the tank 10 of the sonic unit hereinabove described. A light source 18 is focussed by means of a condensing lens 19 onto a pinhole aperture plate 20, which obstructs all light except that passing through the pinhole 21. The diverging light passing through the pinhole 21 is rendered parallel by a collimating lens 22, passes through the tank 10, and is converged by a focusing lens 23 to the focal plane of this lens, at which plane a pinhead light shield 24 is centered on the optical axis 17. The diameter of the circular pinhead light shield 24 is slightly larger than the bundle of focussed light rays at this point, e. g., slightly larger than pinhole 21 if lenses 22 and 23 are of equal focal length, and hence will allow no light to pass beyond pinhead 24 in the absence of a sound field in the sonic unit. The presence or absence of tank 10 itself, having parallel windowed walls 10' and being filled with an optically transparent and uniform fluid 11, will not affect the register on the pinhead 24 of the incident bundle of light rays represented by the axial ray along the axis 17 and a pair of limiting rays 28 and 29, even though the tank be aligned non-normally to the optical axis 17, nor will a specimen prism 16', providing it is optically transparent and uniform and has parallel major faces. Thus the portion of the optical system so far described from light source 18 to pinhead 24, including the electrically unexcited, optically non-deviating sonic unit, may be thought of as a symmetrical Schlieren optical system for testing non-uniformities in optical index of specimens immersed in the fluid 11 of a tank 10, or the non-uniformities of optical index which might be induced by sound waves in an otherwise uniform liquid medium 11 and specimen 16'. Such light rays as are bent by optical index variations will not fall on the pinhead 24, but will go on past and may be used for image formation by an eye placed directly behind the pinhead 24 or by a projection lens 25 and a screen 26. Since the optical disturbance due to sound waves that it is desired to detect will be located in or close to a central plane in the tank hereinafter called the object plane, the plane being parallel to the windows 10' and passing through a set of central points 32, 32', 32'' and 32''', the screen 26 is positioned at the conjugate focus of these points with respect to the lens 25 to form images 33, 33', 33'' and 33''', respectively of points 32, 32', 32'' and 32''', the image points being spatially reversed with respect to the object points.

The projection lens 25 may be small if placed close to pinhead 24 since at this point the bundle of deviated rays will be of smaller diameter. Or the lens 25 may alternatively be eliminated by moving the pinhead 24 and lens 23 as a unit far enough away from the sonic unit 10 that lens 23 itself also forms images of object points 32, 32', 32'' and 32''', on the screen. For this purpose the distance between lens 23 and object point 32 is made greater than the focal length of lens 23, and screen positioned to match.

By the above optical arrangement a sound field in the liquid medium of the tank 10 or in an inserted optically transparent prism 16' may be rendered visible. For example, traveling sound waves, consisting of sinusoidal variations of hydrostatic pressure in the liquid traveling through the tank from the sound radiator 13, 14, 15, to the absorbing pad 16 produce a traveling sinusoidal variation of optical index of refraction in this part of the medium, increased optical index in the compression regions and decreased optical index in the rarefaction regions. The motion of the sound waves through the tank is too fast for the individual effects of successive compressions and rarefactions to be observed by the eye. However, their time integrated effect will be observed. A region in the tank not traversed by sound waves will be recorded on the screen as dark. Another region traversed by weak sound waves will pass some light to the corresponding region on the screen and hence be recorded as weakly illuminated. A region traversed by stronger sound waves will pass more light and be recorded as brighter. At a certain level of sound intensity the maximum amount of light is transmitted to the screen and no greater brightness can be produced on the screen. With white light illumination all sound intensities above this level give approximately the same screen brightness. Below this level of sound intensity the screen illumination is very roughly proportional to the sound intensity producing the screen illumination. Thus, if the sound radiator 13, 14, 15 is excited at a constant but not too high level the screen image will be an approximate record of spatial variations of sound intensity in the object plane parallel to the tank windows 10'. If the radiated sound beam were unaffected by attenuation or wave diffraction it would have a uniform cross section and intensity from radiator to pad 16 and would be recorded on the screen as a horizontal strip of uniform illumination. Due to attenuation of the sound in the medium 11, the screen illumination will drop off from radiator end to absorber end approximately proportionally to the decrease in sound intensity reduction. Due to sound wave diffraction the sound beam will spread beyond its initial geometrical boundaries and may be coursed by interference and reinforcement regions of lesser and greater sound intensity which will likewise be recorded on the screen. By the insertion of the prism 16' the sound beam is bent in its course and likewise is recorded on the screen. The important feature to notice is that regions of low and high sound intensity are recorded on the screen by corresponding regions of low and high illumination.

By an arrangement, wherein a pinhole aperture like 21 is substituted for the pinhead 24, the screen illumination would be inverted, that is high sound intensity is recorded as low screen illumination and low sound intensity by high illumination. This arrangement is usually not as advantageous as that above described.

It is desirable in explaining the operation of systems embodying the invention to make use of some mathematical relations between sound beam intensity and light transmission intensity, making reference to the following published articles:

(1) C. V. Raman and N. S. Nagenda Nath, Proc. Indian Acad. Sc., (A) 2 (406–420) 1935; (A) 3 (75–84) 1936.

(2) G. W. Willard, Jl. Acous. Soc. Am., 21 (101–108) March, 1949. The theory of Raman-Nath (1) regarding the diffraction of light by high frequency sound waves will be utilized. The symbolization as used by this applicant in reference (2) will be followed here. As pointed out in the latter reference, Formula 8, the sound intensity in a transparent medium traversed by a sound beam of uniform intensity $J$ may be calculated in terms of the density of the medium, the velocity of sound in the medium, the optical index of refraction of the medium, and the amplitude of optical index variation $\Delta\mu$ caused by the sound; the sound intensity $J$ being proportional to $(\Delta\mu)^2$. Actually, we are only interested in the optical index amplitude $\Delta\mu$ itself here.

In order to satisfy the conditions of the theory here introduced, it is necessary that the diameter of the pinhole 21 be sufficiently small; more specifically less than $(\lambda/\Lambda)F$, where $\lambda$ is the smallest light wavelength used, $\Lambda$ is the largest sound wavelength involved and $F$ is the focal length of the collimating lens 22. As previously noted, the pinhead aperture 24 is of just sufficient size to cover the image falling upon it. Further, the sound intensity must be sufficiently low and the width of the sound beam sufficiently restricted as prescribed in reference (2). In practice, however, these conditions do not have to be closely met in order to obtain good results.

Figure 6:
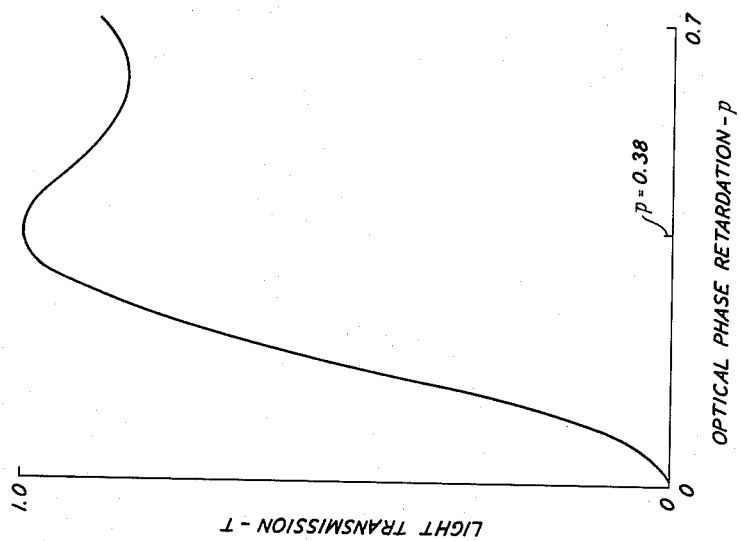
Fig. 6 is a graph of light transmission, as a function of optical phase retardation for monochromatic illumination.

Now if one considers a cylindrical element of volume in the sound field, say surrounding the point 32, the volume element being sufficiently small that the sound intensity may be considered uniform throughout the volume, and $w$ being the axial length of the volume, as indicated in Fig. 1, which axis is parallel to the optical axis 17, then the intensity of light passing through the cross section of the cylindrical volume and falling upon the pinhead 24 will be given by $kJ_0^2(2\pi p)$, where $k$ is the light intensity when no sound wave is present, $J_0$ is the zero order Bessel's function of the argument $(2\pi p)$, and $p$ is the amplitude of the optical phase retardation produced in traversing the sound field and is given by $p = w \cdot \Delta\mu/\lambda$; $\lambda$ being the wavelength of light used. Or the fraction of the light that falls on the pinhead 24 in the presence of sound waves, relative to that in the absence of sound waves is $J_0^2(2\pi p) = J_0^2(2\pi w \cdot \Delta\mu/\lambda)$. Now considering the light from this volume element at 32 which is bent by the sound waves, and passes by the pinhead 24 to fall on the screen over an area about the point 33 corresponding to the cross-sectional area of the unit volume about 32, this light is a fraction of the total light that could fall in this area, such fraction being called the light transmission T for this pencil of light rays, given by $T = 1 - J_0^2(2\pi p)$. In the absence of sound waves about the point 32, $\Delta\mu = 0$, $J_0^2 = 1$, omitting the argument $(2\pi p)$ for brevity, and $T = 1 - J_0^2 = $ zero and no light falls at 33. As the sound intensity increases, up to $p = w \cdot \Delta\mu/\lambda = .38$, $J_0^2$ decreases (see Fig. 2, ref. (2)) to zero and the light transmission $(1 - J_0^2)$ to point 33 increases to unity, as shown in Fig. 6.

Figure 7:
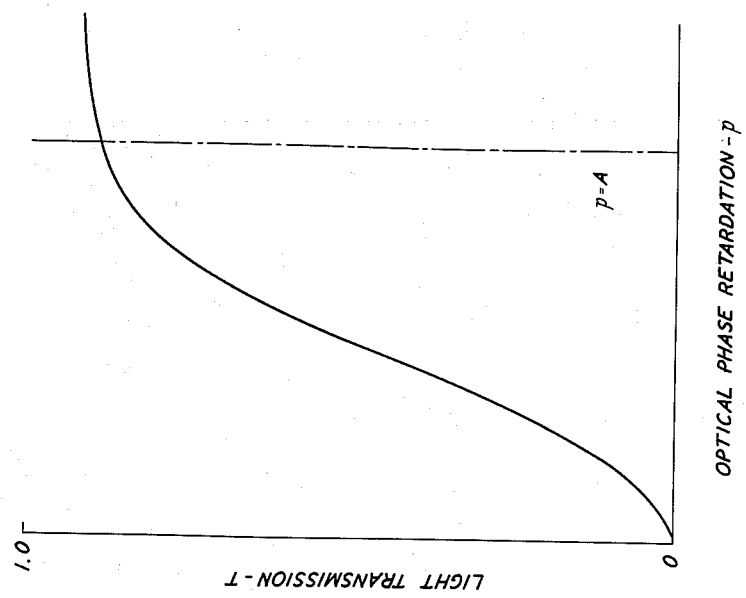
Fig. 7 is a graph like that of Fig. 6 except that it is for white light illumination.

In case white light is used, $\lambda$ varies over a considerable range but the light transmission T can be plotted as shown by Fig. 7, against $w \cdot \Delta\mu/\lambda$. Beyond point $p = A$ the transmission increases only gradually with the sound intensity, as measured by $\Delta\mu$.

In actual use of the equipment to measure sound velocities there are in general two separate, non-superimposed, or in some cases superimposed, sound beams traversing a portion of the length of the sonic unit 10. These two sound beams may be separated portions of the original beam radiated from the radiator, one portion having been transmitted through the specimen prism 16' and the other portion having passed through the tank unobstructed. In general, if desired, the two or more sound beams may be generated by separate radiators, which may be disposed so as to proceed side by side in the same direction, or in opposite directions or in directions which though normal to the optical axis 17 may be angularly disposed to each other. Further, at the same time that a specimen prism 16' is interposed in one beam, a similar or different standardizing prism may be interposed in another beam. In any case the question of interest now is, what will be the effect of two individual sound beams on the light rays passing through them. Suppose for example that a ray of light passing through the point 32 traverses one sound beam of which $w_1$ and optical index amplitude $\Delta\mu_1$, and transverses a second sound beam of which $w_2$ and index amplitude $\Delta\mu_2$. Then the total phase retardation $p$ suffered by the light beam will be the sum of the individual phase retardations $p = p_1 + p_2 = (w_1\Delta\mu_1 + w_2\Delta\mu_2)/\lambda$, and the light transmission to the screen point 33 will be $$T = 1 - J_0^2[2\pi(w_1\Delta\mu_1 + w_2\Delta\mu_2)/\lambda]$$

However, in this case it will be necessary to take account of the relative phases of the two sound waves at the line through point 32 and parallel to the optical axis 17. For example if the two sound beams are of equal width $w_2 = w_1$ and of equal index amplitude $\Delta\mu_2 = \Delta\mu_1$, and exactly in phase then $p = 2w_1\Delta\mu_1/\lambda = 2p_1$, but if they are exactly 180 degrees out of phase, $p = $ zero. For the former case the light transmission will be $T = 1 - J_0(4\pi p_1)$, i. e. greater than for either beam alone, while for the latter case the light transmission will be $$T = 1 - J_0(\text{zero}) = 1 - 1 = \text{zero}$$

For other phase conditions the transmission will be intermediate.

Figure 2:
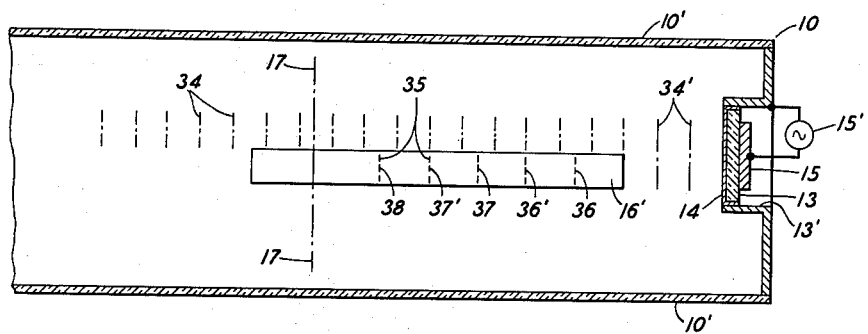
Fig. 2 is a top view of the arrangement of Fig. 1, omitting optical parts, but indicating part of an instantaneous set of radiated sound wave fronts.
Figure 3:
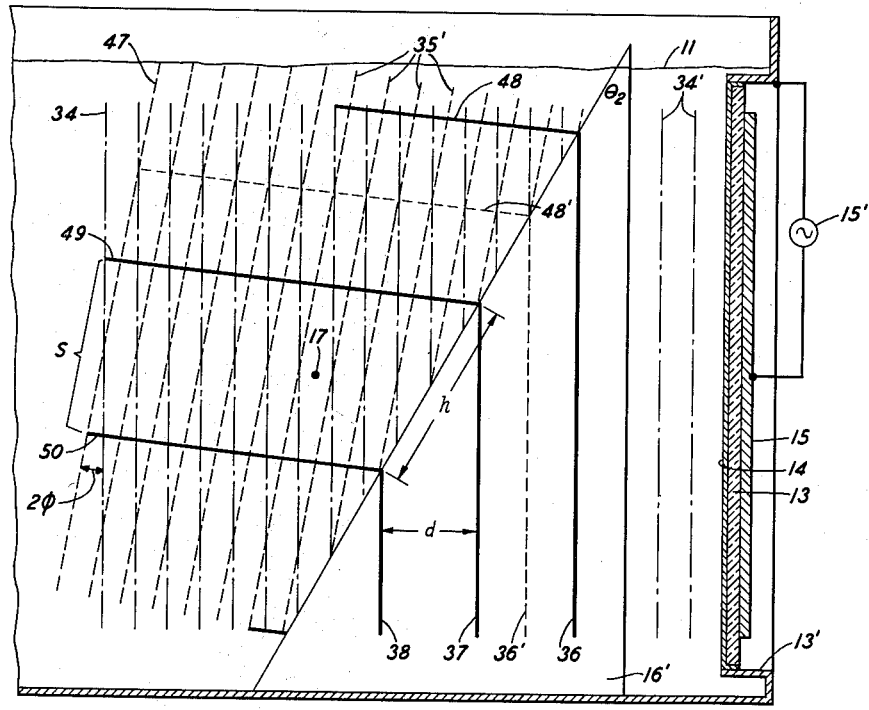
Fig. 3 is a side view of the arrangement of Fig. 1, plus an indication of the optically non-responsive regions of the radiated sound field.

Figs. 2 and 3 are, respectively, essentially top and side views of a portion of the tank 10, the prism 16′, and a portion of the sound field. As in Fig. 1, elements 13, 14, 15, comprise the sound radiator unit, and 10′ designates the parallel tank windows. The sound field is represented in terms of instantaneous sound wave fronts, a wave front being taken as a region of maximum compression of the medium. In all cases it is assumed that the sound wave is sinusoidal, i. e. the sound pressure is a sinusoidal function of both time and distance. At a particular instant $t_0$, after the radiator has been excited with a constant oscillatory voltage, when steady state conditions have been reached, the unbroken sound wave fronts 34′ will be located as shown between the radiator 13, 14, 15 and the specimen prism 16′. The presence of the prism extending approximately half-way into the sound beam divides it, the wave fronts in the prism 16′ being shown by lines 35 and in the surrounding liquid medium by lines 34. For purposes of illustration, in the present diagram the velocity $v_2$ in the prism has been taken to be equal to ⅔ the velocity $v_1$ in the liquid. Hence the wavelength $\Lambda_2$ in the prism will be ⅔ the wavelength $\Lambda_1$ in the liquid, since the formula $\Lambda = v/f$ relates the sound wavelength $\Lambda$ and the velocity $v$ to the frequency $f$. The wave fronts 34 and 35 are not shown in Fig. 3 over the region covered by the prism, to avoid confusion, but they are parallel to wave fronts 34′ and spaced as shown in Fig. 2. On emerging from the prism the wave fronts 35 are bent and become wave fronts 47 in the liquid, and are shown only in Fig. 3. The wave fronts 34 of the beam entirely in water remain as recorded in both figures. In each figure all the wave fronts shown are normal to the plane of the figures, and are always parallel to the optical axis 17.

Fig. 2 further shows that at the instant $t_0$ the sound waves 35 in the prism are in phase with the adjacent waves 34 in the liquid at certain locations 36′ along the beam, while at other locations 36, 37, 38 they are exactly 180 degrees out of phase. That is, at locations 36, 37, 38 a maximum of compression in waves 35 is opposite a region of maximum rarefaction in waves 34.

Now the optical index variations along the sound beam correspond to the sound pressure variations, increased index occurring in compression regions and decreased index occurring in rarefaction regions, the index varying sinusoidally in the same way as the pressure. On the wave fronts 34 the index is $\mu_1 + \Delta\mu_1$, and at exactly intermediate points between wave fronts 34 the index is $\mu_1 - \Delta\mu_1$. On the wave fronts 35 in the prism the index is $\mu_2 + \Delta\mu_2$ and at exactly intermediate points it is $\mu_2 - \Delta\mu_2$. Thus a light ray traveling parallel to the optical axis through region 36 or 37 or 38 suffers a total phase retardation of $p = p_1 + p_2 = w_2 \cdot \Delta\mu_2 - w_1 \cdot \Delta\mu_1)/\lambda$, where $w_1$ and $w_2$ are the widths of the sound beams 34 and 35 respectively. Though the amplitude of index change $\Delta\mu_2$ may not equal $\Delta\mu_1$, the prism 16′ may be so positioned with respect to the incident sound beam 34′ as to adjust $w_2$ and $w_1$ so that $w_2 \Delta\mu_2 = w_1 \Delta\mu_1$. In such a case light rays traversing the two sound beams through the regions 36, 37, 38 are neither retarded nor advanced over those traveling the same course in the absence of sound beams, the total phase retardation being $p = p_1 + p_2 =$ zero. On the other hand, a light ray traveling through a region 36′, exactly intermediate between regions 36 and 37 encounters increased index in both beams and the retardation here is a maximum, $$p = p_1 + p_2 = (w_2 \Delta\mu_2 + w_2 \Delta\mu_2)/\lambda = 2p_2$$

Fig. 4 shows how the phase retardation varies with both location and time. The phase retardation through the sound wave 35 in the prism may be given as a function of time $t$ and location $x$ along the beam and phase amplitude $p_0 = w_2 \cdot \Delta\mu_2/\lambda$, as $p_2 = p_0 \sin 2\pi(ft - x/\Lambda_2)$ and for wave 34 in the liquid correspondingly as $$p_1 = p_0 \sin 2\pi(ft - x/\Lambda_1)$$

since for our present discussion we have chosen $$w_1 \Delta\mu_1 = w_2 \Delta\mu_2 = \lambda p_0$$

In Fig. 4, graph A, the retardations are plotted for the instant $t_0$ as pictured in Fig. 2 and 3. The solid curve shows the variation of the phase retardation with the location along the sound beam for the sound waves 34 in the water. The dotted curve shows the variation of the phase retardation with the location along the sound beam for the sound waves 35 in the prism. It is seen that at locations 36 and 37 the sum of the retardations is $p = p_1 + p_2 = p_0 - p_0 =$ zero. At location 36′ the total retardation is maximum $p = p_0 + p_0 = 2p_0$. At intermediate locations the total retardation may have intermediate positive or negative value.

Fig. 4, graph B, shows corresponding phase retardations at an instant of time $\Delta t$ later than $t_0$, $\Delta t$ being small compared to $1/f$. Whereas the wave 35 has progressed a distance $\Delta x_2 = v_2 \Delta t$, wave 34 has progressed only $\Delta x_1 = v_1 \Delta t_1$. Similarly Fig. 4, graph C, shows conditions at a later time $(t_0 + 2\Delta t)$, and Fig. 4, graph D, at a still later time $(t_0 + 3\Delta t)$. It can be seen in the figure, that at locations 36 and 37 which are indicated in the figure, the individual phase retardations $p_1$ and $p_2$ are in each case equal and opposite so that $p = p_1 + p_2 =$ zero. For location 36′, intermediate between 36 and 37, the individual retardations $p_1$ and $p_2$ may be equal or different, and of the same or opposite phase, so that the total phase retardation will vary with the time from $p = +p_0 + p_0 = 2p_0$ to $p = 0 + 0 =$ zero to $p = -p_0 - p_0 = -2p_0$, etc. For other locations along the sound beams the total phase retardation varies like that at 36′ but with less than maximum amplitude. But only at locations such as 36 and 37 is $p = p_1 + p_2 =$ zero for all times.

Mathematically the total phase retardation $p$ may be given as a function of time and distance by adding the two above given phase functions $p_1$ and $p_2$, as $$p = p_1 + p_2 = 2p_0 \cdot \cos \pi x \left(\frac{1}{\Lambda_1} - \frac{1}{\Lambda_2}\right) \cdot \sin 2\pi \left[ft - \frac{x}{2}\left(\frac{1}{\Lambda_1} + \frac{1}{\Lambda_2}\right)\right]$$

It is seen that the cosine term is independent of time. Hence for certain values of $x$, namely $$\pi x(1/\Lambda_1 - 1/\Lambda_2) = \pi/2, \pi/2 + \pi, \pi/2 + 2\pi, \cdots \pi/2 +$$

$$n\pi, \text{ or } x_n = \frac{1/2 + n}{1/\Lambda_1 - 1/\Lambda_2}$$

the cosine term reduces to zero so that $p$ is zero for all time. This is the condition previously described as occurring at points 36, 37, 38 of Figs. 2 and 4. On the other hand, at points like 36′, $$x'_n = n / \left(\frac{1}{\Lambda_1} - \frac{1}{\Lambda_2}\right)$$

the cosine term reduces to unity and the phase retardation is given by $p = 2p_0 \cdot \sin 2\pi(ft - n\alpha'/2)$, where $$\alpha' = \left(\frac{1}{\Lambda_1} + \frac{1}{\Lambda_2}\right) / \left(\frac{1}{\Lambda_1} - \frac{1}{\Lambda_2}\right)$$

a sinusoidal variation with time of amplitude $2p_0$. For all other values of $x$, that is at intermediate points, $p = k(2p_0) \sin 2\pi(ft - \alpha)$, where $$\alpha = \frac{x}{2}\left(\frac{1}{\Lambda_1} + \frac{1}{\Lambda_2}\right)$$

where $k < 1$ and is a function of $x$. The spacing $d$ between regions of zero total phase retardation is given by $d = x_n - x_{n-1} = 1/(1/\Lambda_1 - 1/\Lambda_2)$. This of course is likewise the spacing between regions of oscillating phase retardation of maximum amplitude since $$x'_n - x'_{n-1} = 1/(1/\Lambda_1 - 1/\Lambda_2) = d,$$

or any other set of equivalent points. Or since $$f = v_1/\Lambda_1 = v_2/\Lambda_2,$$

$f \cdot d = 1/(1/v_1 - 1/v_2)$. Thus if the frequency $f$ and the velocity in the liquid $v_1$ are known, the velocity $v_2$ in the solid specimen 16' is given in terms of the spacing $d$ by $v_2 = 1/(1/v_1 - 1/f \cdot d)$. As will be shown the spacing $d$ can be easily measured.

Returning now to a consideration of the light transmission through the system, it has been pointed out that a light ray, which on traversing the sonic unit encounters no phase retardation will fall on the pinhead 24. However, a light ray which encounters phase retardation will be deflected around the pinhead 24 and illuminate the screen 26 at a point corresponding to the location in the tank 10 through which the ray traveled. Thus light rays traveling through the line regions 36, 37, 38 suffer an oscillating phase retardation and hence will pass the pinhead 24 and be recorded as corresponding illuminated areas on the screen. In particular the light rays traversing the exactly central line region 36' suffer the greatest amplitude of time variation in phase retardation and hence will be recorded on the screen as line regions of maximum illumination. Thus the screen image illumination over the area corresponding to that of the prism 16' may be used to determine the spacing $d$ (Fig. 3) of regions of zero phase retardation. The spacing $d'$ on the screen will in general be different than the spacing $d$ in the tank by a factor M, that is, $d' = Md$, representing the magnification of the optical system from point 32 to point 33 in Fig. 1. The magnification M may be simply determined experimentally by placing a transparent ruled scale in the tank 10 with face normal to the optic axis and in plane of point 32. Or the scale may be simultaneously projected during the measurements and its magnified view on the screen used to measure the band spacing $d$, directly. In any case the spacing $d$ in the tank, as determined from screen measurements, is used in the formula previously given for the velocity in the specimen 16':

$$v_2 = 1/(1/v_1 - 1/f \cdot d)$$

Now inasmuch as the frequency $f$ of the oscillation voltage applied to the generator is easily measured with accuracy, and the sound velocity $v_1$ in many liquid media is accurately known, e. g., for water at temperature $\tau$, $v_1 = [1.557 - 2.45 \times 10^{-5}(74-\tau)^2] \times 10^5$ cm. per sec., one may calculate from the spacing $d$ the velocity of sound $v_2$ in the test specimen 16' at the temperature and frequency used in the experiment as $v_2 = 1/(1/v_1 - 1/fd)$.

Numerous variations of technique are possible within the scope of the invention. For example, if, as has been assumed in the mathematical treatment, the sound amplitudes are kept small so that the maximum phase retardations are less than $p = .38$, as indicated in Fig. 6 for monochromatic illumination, or below point A of Fig. 7 for white light illumination, the light intensity on the screen will alternate from light to dark very roughly sinusoidally about a mean value. However, increasing the sound intensity will improve the accuracy of measurement. The light intensity in the region between the black-band regions will increase up to a maximum value over a wider region, thus resulting in a picture of fine sharp black lines between wide bright strips, the spacing remaining constant. The dark-line regions corresponding to zero phase shift can never receive light, but with increasing $p$ values, all other regions can build up to a maximum. Further, the use of white light or light of any number of different wavelengths or ranges of wavelengths may be used, and the resulting screen views will differ only in color and degree of illumination, not in spacing of bands. Also, improper positioning of prism 16' in the sound beam 34', such that $w_1 \Delta \mu_1 \neq w_2 \Delta \mu_2$, acts merely to overlay the screen image with a uniform brightness of illumination, making the contrast poorer but not changing the spacing. Improper choice of size of pinhole 21 or pinhead 24 also only effects the degree of illumination and not the spacing.

Figure 8A:
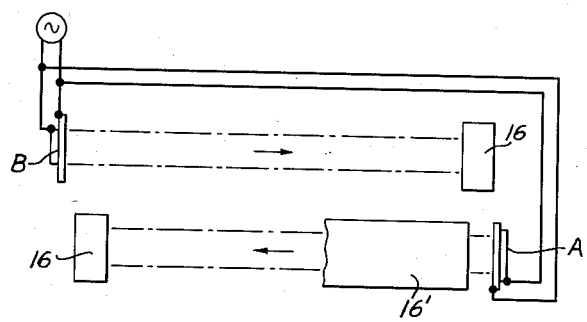
Fig. 8A is a plan view and Fig. 8B an elevational view of the mechanical transmission parts of an alternative measuring arrangement, with the optical axis indicated.
Figure 8B:
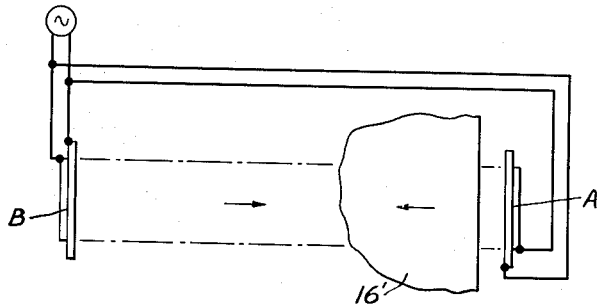

Figs. 8-A and 8-B show an alternative arrangement of sonic equipment, in which two sound radiators A, B may be employed, one in each end of the tank 10 of Fig. 1. One of these radiators A may correspond to the forward half of radiator 13, 14, 15 and thus send a sound beam through the specimen 16', as before. The other radiator B, having the same natural frequency, and preferably being electrically connected in parallel with the former, may be placed in the other end of the tank, parallel to the former, but displaced by its width in the direction of the optic axis, so that it radiates a sound beam through the liquid medium as before but in the opposite direction. (Pads 16 absorb the sound beams at the end of their course.) In this case, the above mathematical treatment may be used to show that $$1/d = 1/\Lambda_1 + 1/\Lambda_2$$

or that $v_2 = 1/(1/fd - 1/v_1)$. In certain cases, there may be advantage in this arrangement. For example, if $v_2$ is nearly equal to $v_1$, then $d = 1/(1 \Lambda_1 - 1/\Lambda_2)$ by the first method, gives a $d$ spacing so large that only one or two bands might appear in the field of view, and the $d$ spacing would be impossible or difficult to measure. Whereas, by the alternative, opposed-beam method $d = 1/(1/\Lambda_1 + 1/\Lambda_2)$ would give a smaller $d$ spacing which would be measurable.

So far, the optical effects due to the sound waves in the region of or within the projected area of the test specimen 16' in Figs. 1, 2, 3, have been described. It has been shown how for a transparent prism, the velocity of sound $v_2$ of the prism material may be found. Using the method so far described, it is unnecessary that the test prism be in the form of a triangular prism. It is only necessary that it be transparent, of uniform optical index, have polished parallel major faces, and have at least one edge face, not necessarily polished, through which the sound may enter, said face being disposed parallel and adjacent to the sound radiator. Now an extension of the above method may be used in case the test material is opaque. For this purpose, the test specimen may be made in the form of the prism 16', shown in Figs. 1, 2, 3. The angle $\theta_2$ between the edge faces through which the sound beam 35 passes must be known.

As shown in Fig. 3, each wave front of the sound beam passing through the prism, which at time $t_0$ crosses the hypotenuse of the test prism 16' and hence is partly within the prism and partly without, consists of two straight portions, the one inside being parallel to the incident fronts 34' and the part outside in the water being parallel to a new direction, which direction is inclined to the former by the deviation angle $2\varphi$ to be defined hereinafter. These inclined wave fronts 35' will be spaced $\Lambda_1$ apart, since the wave is now traveling in water again. The wave fronts 34 of the sound beam which has always traveled in water will still be spaced $\Lambda_1$ apart and still parallel to wave fronts 34'. It is clear that the wave fronts 35' cross the wave fronts 34 at points along a line such as 48'. Thus, along this line, the two sound beams are in phase. However, along parallel lines such as 48, 49, 50, it is seen that the two beams are exactly out of phase, compression of one being coincident with the rarefaction of the other. Thus, at points along the lines 48, 49, 50, the total phase retardation suffered by a light ray passing through the two beams is $p = 0$, and from these line regions of the sound field, no light will be sent to the screen. On the other hand, for intermediate regions, such as 48', the phase retardation is not zero, but in fact maximum, and corresponding regions on the screen will receive maximum illumination. This same illumination condition will hold as time progresses, thus giving for every dark line inside the prism boundary 37 a corresponding dark line outside the prism boundary 49. Without discussion of the angular relations involved between wave fronts and prism, it is seen that the spacing $h$ (Fig. 3) measured parallel to the prism hypotenuse may be obtained by measuring between bands 48, 49, 50 adjacent and parallel to the prism hypotenuse. It is easily seen that the spacing $h$ is related to the spacing $d$, before discussed, between bands 36, 37, 38, by $d=h \sin \theta_2$, where $\theta_2$ is the prism angle shown. Thus, even if the prism specimen 16' be composed of opaque material or be effectively opaque due to unpolished surface conditions, the spacing $d$ before desired may be obtained. Then, as before, $v_2=1/(1/v_1-1/fd)$, or here $v_2=1/(1/v_1-1/fh \sin \theta)$, and the sound velocity in the specimen is again measurable. It is convenient to make the prism angle $\theta_2=30°$ so that $d=h/2$, whence $$v_2=1/(1/v_1-2/fh)$$

In the preceding paragraph, it was assumed that there was no phase shift as the sound wave passed through the hypotenuse boundary of the prism, from prism to water. Hence, in the figure, wave fronts 35' in the water meet the wave fronts 35 in the prism at the boundary, and similarly, line regions 48, 49, 50 meet those inside, 36, 37, 38, respectively. Ordinarily, there will be some phase shift when a sound wave crosses a boundary between two media, the amount depending upon the ratio of the acoustic impedances of the two media and the angle of refraction. However, since the phase shift will be constant all along the boundary, its only effect will be to displace by translation parallel to the boundary all wave fronts 35', and lines 48, 48', 49, 50, yet leaving all spacings between wave fronts 35' and between constant phase retardation lines 48, 48', 49, 50 the same as before. Hence the presence of phase shift at the boundary is of no concern in the measurements described.

For convenience of calculating of velocity $v_2$, it is preferable to measure the spacing between lines 48, 49, 50 along the hypotenuse, thus measuring $h$ as above described. However, under some conditions, it may be more accurate, convenient or desirable to measure the normal spacing $s$ of the bands 48, 49, 50, i. e., to measure their separations along a line normal to the bands. When the spacing $s$ instead of $h$ is measured, one must take account of the angular relations involved in the sound field. Fig. 5 shows that a sound beam progressing in the direction of the arrow 51 entering the prism 16' normal to the boundary surface is unrefracted and continues in the direction of the line 52 parallel to 51. On passing through the hypotenuse face of the prism 16', the beam is angularly deviated by refraction to the direction of the arrow 53. The angular displacement between the directions of 53 and 52 or 51, herein designated as $2\varphi$ for convenience in deriving general formulae hereinafter in an analysis based upon Fig. 9, may be obtained from the law of refraction. The beam along the line 52 incident upon the hypotenuse boundary at an angle $\theta_2$ to the normal to the boundary NN, emerges from the boundary at an angle $\theta_1$ to the normal NN given by $v_2/\sin \theta_2 = v_1/\sin \theta_1$. The deviation angle $2\varphi$ is given by $2\varphi=\theta_2-\theta_1$. By a trigonometric argument, the previously used internal spacing $d$ may now be determined in terms of the external spacing $s$, substituted in the previous formula for $v_2=1/(1/v_1-1/fd)$, and hence $v_2$ determined in terms of $s$. However, by a more direct and fundamental method, the phase retardation effects within the area of the prism may be disregarded, the law of refraction giving the deviation angle $2\varphi$ being used, and the phase retardation relations in the crossed sound beams beyond the prism may be calculated.

Figure 9:
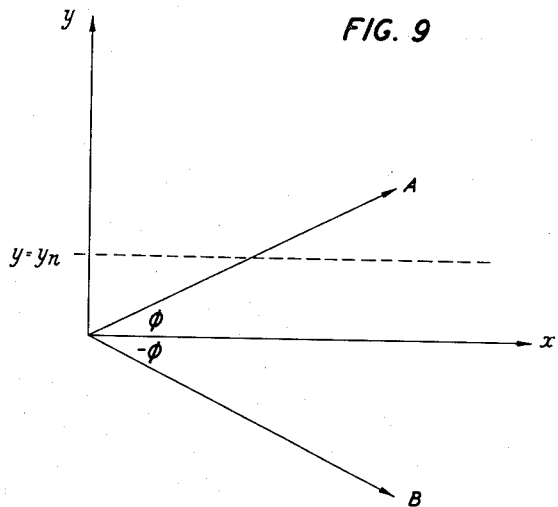
Fig. 9 is a schematic diagram of a coordinate system useful in analyzing a pair of sound fields.

The optical phase retardation suffered by a light ray traversing two sound fields, such as 34 and 35' Fig. 3, whose wave fronts and whose direction of propagation are angularly disposed to each other by the angle of inclination $2\varphi$ may be determined as follows. Let a coordinate system as shown in Fig. 9 be used for which the $x$-axis bisects the angle between the directions of forward propagation of the two sound beams A and B and is positive in the direction of forward propagation, and the $y$-axis is normal to the $x$-axis. Then, since $2\varphi$ is the angle between the two directions of propagation, one beam is inclined at an angle $\varphi$ to the $x$-axis and the other at an angle $-\varphi$, and it is of no concern which is which nor where the center of the coordinate system is located. Then assuming, as is the case at hand, that the two sound beams are of the same frequency $f$, are in the same medium and hence have the same velocity $v_1$ and wavelength $\Lambda_1$, and that the optical index amplitude variations $\Delta\mu_1$ and $\Delta\mu_2$ and the widths of the sound beams $w_1$ and $w_2$ are so adjusted as before that $$\frac{w_1\Delta\mu_1}{\lambda}=\frac{w_2\Delta\mu_2}{\lambda}=p_0$$

the sum of the progressive phase retardations may be written as follows:

$$p=p_1+p_2=p_0 \cos [\omega t-k(x \cos \varphi+y \sin \varphi)]+ \\ p_0 \cos [\omega t-k(x \cos \varphi-y \sin \varphi)]$$

where $\omega=2\pi f$, $k=2\pi f/v_1=2\pi/\Lambda_1$. The formula for $p$ may be changed to the form $$p=2p_0 \cos [ky \sin \varphi] \cos [\omega t-kx \cos \varphi]$$

It is seen that the second cosine term oscillates with time $t$ and is also a function of distance $x$ along the $x$-axis, while the first cosine term is a function of distance $y$ along the $y$-axis only. Hence, along any line parallel to the $y$-axis defined by $$ky_n \sin \varphi = \frac{\pi}{2}+n\pi$$

or $y_n=(\pi/2+n\pi)/k \sin \varphi$, the first cosine term has the value zero and hence the total phase retardation $p$ is zero for all time. Such line regions where $p=$zero are shown as 48, 49, 50 in Fig. 3, and their normal spacing $s$ is given by $s=y_n-y_{n-1}=\pi/k \sin \varphi$, or since $k=2\pi f/v_1$, $s=v_1/2f \sin \varphi$, or $\sin \varphi=v_1/2sf$. Thus, it is obvious that, since $v_1$ is assumed known, and $f$ and $s$ can be measured as previously described, the angle $2\varphi$ of deviation between the two sound beams may be readily calculated, $2\varphi=2 \sin^{-1}(v_1/2fs)$. In fact, the angle $2\varphi$ may be more accurately determined in this way than by trying to detect the individual directions of the beams and thus measure their inclination, especially so when the two beams are inclined to each other by a small angle.

Now making use of the law of refraction $v_2/\sin \theta_2=v_1/\sin \theta_1$ and the angular relation $2\varphi=\theta_2-\theta_1$ or $\varphi_1=\theta_2-2\varphi$, as shown in describing Fig. 5, the velocity of sound $v_2$ in the prism specimen is given by $$v_2=v_1 \sin \varphi_2/\sin (\theta_2-2\varphi)$$

where $2\varphi$ is given in terms of the band spacing $s$ in the preceding paragraph. Or finally, $$v_2=\frac{v_1 \sin \theta_2}{\sin [\theta_2-2 \sin^{-1}(v_1/2fs)]}$$

where $v_1$ is the assumed known sound velocity in the liquid medium, $f$ is the measured frequency of the sound waves, $\varphi_2$ is the measured angle of the specimen prism, and $s$ is the spacing in the object plane of the zero phase retardation bands 48, 49, 50 Fig. 3, as measured normally to the bands. As before pointed out $s$ may be determined from the corresponding screen spacing $s'$ by $s=s'/M$.

Variations of the above procedure may be made. For example, in measuring the velocity in opaque prism specimens, as in Fig. 10-A, non-normal incidence may be used. Let the incident edge AA of the prism be inclined at the angle $i$ to the radiator Q, let the angle between the incident edge AA and transmitting edge BB be $\varphi_2$ as before, and let the beam T transmitted through the prism be inclined to the beam R through the reference liquid by the angle $2\varphi$ as before. This arrangement may of course be treated by a generalization of the preceding used in connection with Fig. 3 where $i$ was zero. As in well known optics the figure shows the angles of incidence $i$ and refraction $r$ at the face AA, and of incidence $i'$ and refraction $r'$ at the face BB. In order to obtain the velocity $v_2$ in the material of the prism relative to the velocity $v_1$ of the reference liquid, it is only necessary to measure the band spacing $s$ in the region where both beams T and R are contiguous, from this value of $s$ to calculate the angle of deviation $2\varphi$ from the above given formula $2\varphi = 2 \sin^{-1}(v_1/2 \cdot f \cdot s)$, and to then find the relation between the deviation angle $2\varphi$ and the angles $i$ and $\theta_2$ and the relative velocities $v_1$ and $v_2$. The latter may be derived from the following. The law of refraction gives $$\frac{v^2}{v_1} = \frac{\sin i'}{\sin r'} = \frac{\sin r}{\sin i}$$

Trigonometric construction will show that $$i' + r = \theta_2 \text{ and } 2\varphi_2 = \theta - i - r'$$

Combining formulae we obtain $$\frac{v_2}{v_1} = \frac{\sin (\theta_2 - r)}{\sin (\theta_2 - i - 2\varphi)} = \frac{\sin \left[\theta_2 - \sin^{-1}\left(\frac{v_2}{v_1} \sin i\right)\right]}{\sin \left[\theta_2 - i - 2 \sin^{-1}\left(\frac{v_1}{2fs}\right)\right]}$$

which may be solved for the desired velocity $v_2$ in terms of the known and measured quantities $i$, $\theta_2$, $v_1$, $f$ and $s$. In the specific case already fully described in which $i$=zero, this general formula reduces to the simple form previously given, namely $$\frac{v_2}{v_1} = \frac{\sin \theta_2}{\sin (\theta_2 - 2\varphi)} = \frac{\sin \theta_2}{\sin \left[\theta_2 - 2 \sin^{-1}\left(\frac{v_1}{2fs}\right)\right]}$$

In another specific case the formula is simplified by adjusting the angle $i$ such that $i = r'$. This corresponds to the familiar case in optics of adjustment to the angle of minimum deviation, i. e. $2\varphi$ as a function of $i$ is minimum. In this case $i = r'$, $r = i' = \theta_2/2$, $i = \theta_s/2 - \varphi$, and $v_2$ is given by the simple formula $$\frac{v_2}{v_1} = \frac{\sin (\theta_2/2)}{\sin (\theta_2/2 - \varphi)} = \frac{\sin (\theta_2/2)}{\sin \left[(\theta_2/2) - \sin^{-1}\left(\frac{v_1}{2fs}\right)\right]}$$

Figure 10A:
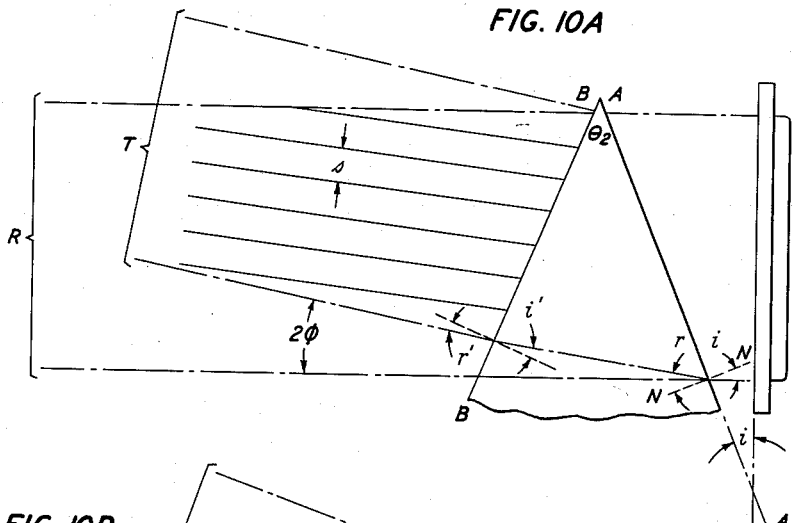
Fig. 10A is a schematic diagram, in elevation, of sound fields and patterns as shown in Fig. 3 except that the prism is so placed as to have no face parallel to the energizing piezoelectric plate.
Figure 10B:
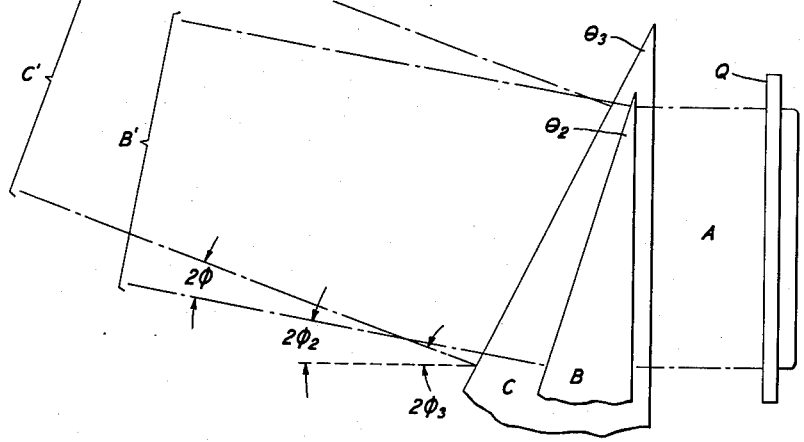
Fig. 10B is a schematic diagram, in elevation, of sound fields and patterns for a system in which waves in two prisms are compared.
Figure 10C:
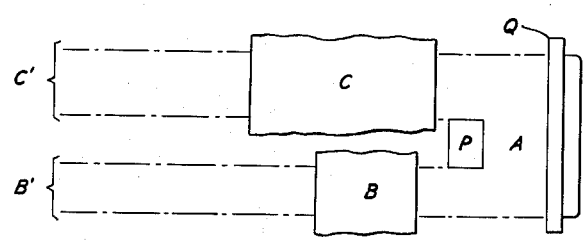
Fig. 10C is a schematic diagram, in plan view, of the arrangement of Fig. 10B.

Another variation involves the use of two prisms, together with a liquid immersion medium as in Figs. 10–B and 10–C. This arrangement is of particular advantage when it is found that the velocity $v_2$ in the test prism matches so closely the velocity $v_1$ in the liquid reference medium that the band spacing $s$, by the previous methods, is too large to give two or more bands over the field of view, whence $s$ cannot be measured. In such a case let a second prism C of known angle $\theta_3$ and velocity $v_3$ be introduced beside the test prism B whose velocity $v_2$ it is desired to find. Then the incident sound beam A divides, part going through prism B and part through prism C, both emerging into the liquid medium as beams B' and C', where their respective inclinations to the incident beam A are $2\varphi_2$ and $2\varphi_3$ and their inclination to each other is $2\Phi = 2\varphi_3 - 2\varphi_2$. Now, even though $2\varphi_2$ may be practically zero because $v_2 \doteq v_1$, the deviation between the two beams B' and C', namely $2\Phi$ may be made large enough to measure by choosing $v_3$ enough different from $v_2$ or choosing $\theta_3$ enough different from $\theta_2$. The applicable formulae are simply obtained. Firstly, $2\Phi$ may be obtained from a measurement of the band spacing $s$, as before, from $\sin \Phi = v_1/2fs$. Secondly, the refraction formulae are: $v_2 \sin r_2 = v_1 \sin \theta_2$ for prism B and $v_3 \sin r_3 = v_1 \sin \theta_3$ for prism C, where $r_2$ and $r_3$ are the angles of refraction and $\theta_2$ and $\theta_3$ are the angles of incidence for the B and C prisms respectively. Further for prism B, $2\varphi_2 = \theta_2 - r_2$ and for prism B, $2\varphi_3 = \theta_3 - r_3$, whence the angle $2\Phi$ between the beams B' and C' is given by $2\Phi = 2\varphi_3 - 2\varphi_2 = (\theta_3 - \theta_2) - (r_3 - r_2)$. Hence, now, $v_2 = v_1 \sin \theta_2 / \sin r_2$ or $$\frac{v_2}{v_1} = \frac{\sin \theta_2}{\sin [2\Phi + r_3 - (\theta_3 - \theta_2)]}$$

$$= \frac{\sin \theta_2}{\sin \left[2 \sin^{-1}\left(\frac{v_1}{2fs}\right) + \sin^{-1}\left(\frac{v_1}{v_3} \sin \theta_3\right) - (\theta_3 - \theta_2)\right]}$$

which gives the desired velocity $v_2$ of the test prism in terms of the velocities $v_1$ and $v_3$ and the prism angles $\theta_2$ and $\theta_3$, and the frequency $f$ and band spacing $s$.

By another variation, Fig. 11–A, one may arrange that the prism specimen divides the incident beam along a horizontal line so that one portion B goes through the prism vertex portion and the other portion A' passes unobstructed over the prism vertex. The former beam bending upward after traversing the prism passes through the latter beam, so that the two sound beams actually pass through the same space for a part of their course. The mathematical treatment of the optical phase retardation and the sonic refraction may be made exactly as before with the same results. It will be noted that in this case, however, there will be actual sound wave interference as well as optical phase retardation interference. However, the appearance of the restricted portion of the field within the region where the two sound beams co-exist or pass through each other is identical, and the formula for the measurements the same.

Fig. 11–B shows a sectional representation of the sound beams of Fig. 11–A.

Other variations may be obtained by using individually excited sound beams traveling in the same or in different directions. In the latter case, Fig. 12–A, whereas the refraction formula remains the same $$v_2 = \frac{v_1 \sin \theta_2}{\sin (\theta_2 - 2\varphi)}$$

the band spacing formula becomes $$\sin \left(\frac{180° - 2\varphi}{2}\right) = \cos \varphi = v_1/2fs$$

since here the angle between the forward directions of the two beams is $(180° - 2\varphi)$, hence giving for $v_2$:

$$v_2 = \frac{v_1 \sin \theta_2}{\sin [\theta_2 - 2 \cos^{-1}(v_1/2fs)]}$$

Fig. 12–B shows a sectional representation of the sound beams of Fig. 12–A.

Figure 13A:
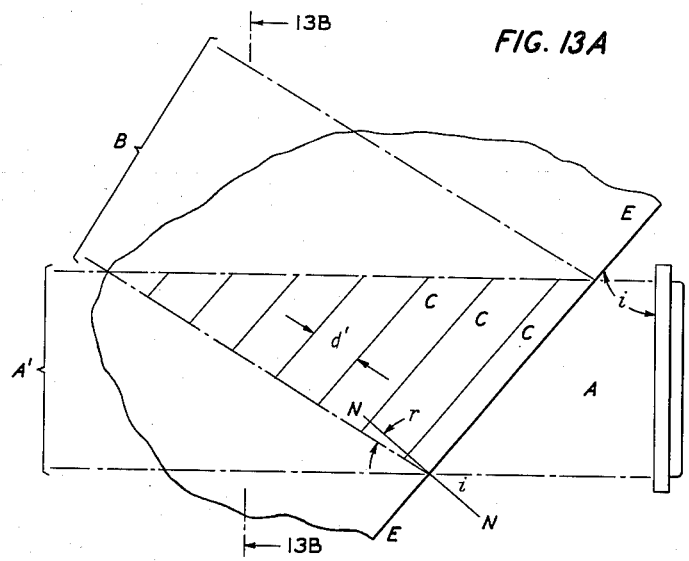
Fig. 13A is a schematic diagram of a variation of the sound beam system in which a solid transparent specimen with two parallel optical surfaces is employed.
Figure 13B:
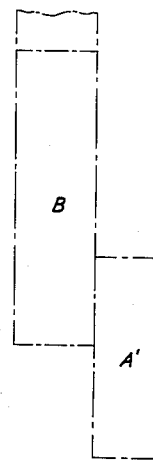
Fig. 13B is a sectional representation of the sound beams of Fig. 13A.

Another variation is by the arrangement of Figs. 13–A and 13–B, wherein a solid transparent specimen with two parallel optical surfaces, and at least one plane edge surface EE is disposed partly in the beam as shown for prism specimen 16' in Fig. 1, with the edge surface EE not parallel to the radiator but inclined by an angle $i$ thereto. This method and arrangement is actually a generalization of the case previously discussed wherein the edge EE was parallel to the radiator, $i$=zero, as with the vertical edge of prism 16' of Fig. 3, and the effects within the prism boundary were used to measure velocity. Here a portion of the sound beam is incident at an angle $i$ relative to the normal NN to surface EE, Fig. 13–A. The beam internally is refracted at the angle $r$ to the normal NN, while the other portion of the sound beam not obstructed by the prism proceeds in its original direction. An analysis like that given for the internal bands 36, 37, 38 of Fig. 3 together with some trigonometric construction will show that here in Fig. 13–A, the bands of zero optical phase retardation C, though still remaining parallel to the edge EE, will not retain the same spacing $$d = \frac{1}{\frac{1}{\lambda_1} - \frac{1}{\lambda_2}}$$

as before. In this case the spacing $d'$ will in general be less than $d$, and is given by $$\frac{1}{f.d'} = \frac{\cos i}{v_1} - \sqrt{\frac{1}{v_2^2} - \frac{\sin^2 i}{v_1^2}}$$

which reduces to $$\frac{1}{f.d'} = \frac{1}{v_1} - \frac{1}{v_2}$$

when $i$=zero, thus giving the same formula as previously developed for the special case mentioned. The unknown velocity $v_2$ is given in terms of the velocity $v_1$ of the reference liquid, the band spacing $d'$, the frequency $f$ and the angle $i$, as $$\frac{1}{v_2} = \sqrt{\left(\frac{1}{v_1} - \frac{1}{f.d'}\right)^2 + \frac{4 \sin^2 (\theta/2)}{\lambda_1 f.d'}}$$

which again reduces to $$\frac{1}{v_2} = \frac{1}{v_1} - \frac{1}{f.d'}$$

when $i$=zero, again giving the formula previously developed for the special case. It may be added that when $v_2 > v_1$, as is usually the case when the test material is a solid and the reference material a liquid, the angle $i$ may not be increased beyond the critical angle $$i_c = \sin^{-1}(v_1/v_2)$$

for when $i > i_c$ the sound incident upon the interface is entirely reflected therefrom and none enters within the solid material.

Fig. 13-B is a sectional representation of the sound beams of Fig. 13-A.

Whereas the above exposition has considered the specimen prism as having only a single velocity of sound propagation, solids in general have two velocities, one $v_L$ for longitudinal or compressional waves, and one $v_T$ for transverse or shear waves, the latter usually being in the neighborhood of one half the former. Actually, in isotropic materials, the two velocities are simply related by the well-known elastic Poisson's ratio $\sigma$, as $$v_T/v_L = [(1-2\sigma)/(2-2\sigma)]^{1/2}$$

On the other hand, sound waves in a liquid can be only of the longitudinal compressional type, except for liquids of so high a viscosity that they would be difficult of utilization for the present purposes. When a sound wave from a liquid enters a solid normally to a plane face, only a longitudinal sound wave is propagated into the solid. If the sound wave leaves the specimen through a normally disposed face, or is entirely absorbed in an extended specimen, then no transverse sound waves will be generated and only the longitudinal velocity $v_L$ can be measured. On the other hand, if the incident sound beam enters the solid at an angle inclined to the normal, both longitudinal and transverse waves may be propagated forward in the prism. When a longitudinal sound wave in a solid strikes a boundary between the solid and a liquid at other than normal incidence, it may generate a reflected transverse sound wave in the solid as well as a transmitted and reflected longitudinal wave. Similarly, when a shear wave in the solid strikes the boundary to a liquid at other than normal incidence, it may generate a reflected longitudinal wave and a transmitted longitudinal wave as well as a reflected shear wave. The angular relations between the various waves depend simply upon the velocities, as $v_1/\sin \theta_1 = v_T/\sin \theta_T = v_L/\sin \theta_L$, where $v_1$, $v_T$, $v_L$ are respectively the velocities in the liquid medium, and the transverse and longitudinal velocities in the solid, and the angles $\theta_1$, $\theta_T$, $\theta_L$ measured from the normal to the interface are respectively for the wave in the liquid and for the transverse and longitudinal waves in the solid. However, the intensity ratios of the various waves are related in a complicated way to the velocities and the angles, as may be found in the literature, e. g., C. G. Knott, Phil. Mag. 48 (69–96), July 1899, and will not be gone into here. The point is that in many cases, it is possible to measure the transverse wave velocity in the solid prism specimen as well as the longitudinal. For this purpose, the prism may be mounted in the beam in such an orientation that the incident longitudinal wave is not normal to the incident face, or internal, off-normal reflections may be made use of to generate the internal transverse waves. In either case, the internal transverse waves may convert to the usual longitudinal waves in the liquid upon emerging from the solid. These waves combined with another beam in the liquid may be used as before to measure the transverse wave velocity in the solid.

Figure 14A:
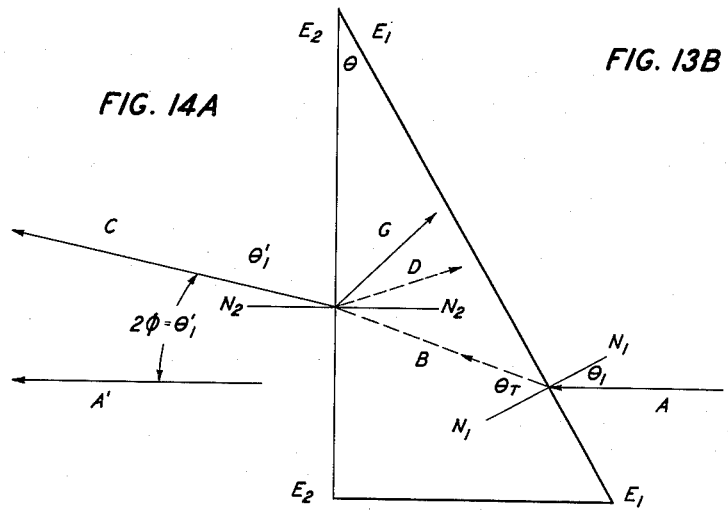
Figure 14B:
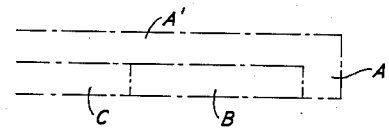

As an example of this method of measuring the transverse velocity, Figs. 14-A, B and C are drawn for a case in which it is assumed that the prism specimen 16' has an acute angle $\theta$=30°, that the velocities in the specimen are for convenience in calculation related by single ratios, $v_L = 2v_T = 3v_1$. The portion of the sound beam incident on the prism in the direction A is arranged to make an angle with the normal $N_1N_1$ of $\theta_1 = \theta = 30°$. The refraction formula now becomes $$\frac{\sin \theta_L}{3} = \frac{\sin \theta_T}{3/2} = \frac{\sin \theta_1}{1} = .5$$

Since $\sin \theta_L = 1.5 > 1.0$ it is obvious that the angle $\theta$ is beyond the critical angle and no longitudinal sound beam is transmitted through the face EE. The transverse beam B within the prism makes an angle $\theta_T$ to the normal $N_1N_1$ given by $\sin \theta_T = 1.5 \times 0.5 = .75$, or $\theta_T = 49°$. The transverse beam B strikes the second face $E_2E_2$ at the angle $\theta'_T = \theta_T - \theta = 19°$ to the normal to this face $N_2N_2$. The refraction law holding at this face may be written in terms of the primed angles:

$$\frac{\sin \theta'_1}{1} = \frac{\sin \theta'_L}{3} = \frac{\sin \theta'_T}{1.5} = \frac{\sin 19°}{1.5} = .22$$

Thus the longitudinal beam C transmitted into the liquid makes an angle $\theta'_1$ with the normal $N_2N_2$ given by $$\sin \theta'_1 = \frac{v_1}{v_T} \sin \theta'_T = \frac{v_1}{v_T} \sin (\theta_T - \theta) = \frac{v_1}{v_T} \sin \left[\sin^{-1}\left(\frac{v_T}{v_1} \sin \theta\right) - \theta\right], \text{ or } \theta'_1 = 12°$$

Since the normal $N_2N_2$ is parallel to the incident beam A, the transmitted beam C makes an angle $\theta'_1$ also with the unobstructed beam A' which has passed by the prism. In the region where the two beams A' and C, Fig. 14-C, each greatly extended in width normal to A' and C' respectively, cross by each other the same optical effects are observed as before, dark and light bands appearing, parallel to the line bisecting the angle between A' and C. Their spacing S is given by the previously derived formula where now $\theta_1 = 2\varphi$, and $\theta_1 = 2\varphi = 2 \sin^{-1}(v_1/2fs)$. Upon combining this formulae with that just given for $\sin \theta'_1$ in terms of $v_1$, $v_T$, and $\theta$, the velocity of transverse waves $v_T$ in the prism is determinable. It is commonly of little concern that other, undesired beams D and G are produced within the prism, for before they may proceed into the region of measurement where A' and C are located they must intercept two faces $E_1E_1$ and $E_2E_2$, at each face losing intensity by reflection and transmission, and also losing intensity by attenuation in their course through the material. These beams may be identified as a reflected transverse beam D making an angle $$\theta'_T = \theta_T - \theta = 19°$$

with the normal $N_2N_2$ and the generated longitudinal beam G making an angle $$\theta'_L = \sin^{-1}\left[\frac{v_L}{v_T} \sin \theta'_T\right] = 42°$$

with the same normal. In cases where one of the extraneous beams D or G causes interference a change of prism angle $\theta$ may eliminate the interference.

Whereas in the above example a specific prism angle $\theta$ and velocity ratios were assumed, in order to give an accurate picture, it is clear that the method is applicable in general. The elimination of a first longitudinal beam in the specimen by choosing the prism angle $\theta$ ($=$ the angle of incidence $\theta_1$) large enough is of primary importance, since such a beam if present would transmit a second beam into the measurement region and cause interference. This beam is non-existent of $$\theta = \theta_1 > \sin^{-1}[v_1/v_2]$$

Figs. 15–A and 15–B show another modification of the above methods, which is especially useful for the measurement of transverse velocity $v_T$. It also has special merit for measuring either $v_T$ or $v_L$, in that no other velocity need be known. In this case one or more sonic radiators are mounted directly on the solid specimen without the intermediate liquid medium. The example chosen to illustrate the method is arranged to measure the transverse velocity $v_T$, with the use of two sonic radiators. The isosceles prism specimen P may be of either transparent or opaque material. Its lower horizontal edge face is placed slightly immersed in the top surface of liquid 11, with its major parallel triangular faces normal to the optical axis 17 of Fig. 1. In Fig. 15–A the optical axis is normal to the plane of the figure. Two identical sonic radiators A and B may be attached to the equal minor edge faces of the prism with a stiff cement, or a wax, or even with a thin layer of very viscous fluid such as poly-($\alpha$-methyl)-styrene. For the purpose of generating transverse sound waves in the specimen, the radiators A and B may be piezo-electric quartz plates of the well-known high-frequency shear-mode types such as Y, A, B, AT, or BT cuts. They should be attached to the prism P with the X crystallographic axes parallel to the triangular faces of the prism in order that the polarized sound beams from such radiators have their particle vibrations parallel to the triangular faces. If the vibration direction of the sound were at 90 degrees to this direction there could be no sound transmission through the bottom face. Each radiator should have approximately the same natural frequency. In cases where the radiators are attached to a metal or electrically conducting prism, the prism may be used for one electrode of each radiator as in the triangular face view of Fig. 15–A. The other electrode E of each radiator may be a flat metal plate lightly pressed against the air surface. The radiators are connected electrically in parallel to the same source of high frequency voltage. In case the prism P is of non-conducting material an inner electrode E' may be provided for each radiator in the form of an evaporated metal coating, which coating may cover the full area of the inner face of the radiator. In this case, contact to the inner electrodes may be made by light metal spring pressure as shown in Fig. 15–B and the other electrode E must be restricted in area so that it covers no more than the portion of the radiator attached to the prism.

With the prism P and radiators A and B so mounted, and with an oscillatory voltage of the proper frequency applied to the electrode, two transverse sound beams will be radiated into the prism, normally to the radiators. These two beams will strike the bottom edge face, which is in contact with the liquid 11 of the tank 10' of Fig. 1, each at the same angle $\theta$ measured from the normal NN, one on each side the normal. At this surface they will be refracted into the water as longitudinal sound beams, each at the same angle $\varphi$ relative to the normal NN, the two beams being transmitted through the water as A' and B' as shown in the Fig. 15, making an angle of $2\varphi$ with each other. The relation between the angles of incidence $\theta$ and refraction $\varphi$ is given by $$\sin \varphi / \sin \theta_T = \Lambda_1/\Lambda_T = v_1/v$$

as before, where $\theta_T$ is also equal to the angle $\theta$ of the prism. Now in the triangular region where the two beams A' and B' pass through each other, there will be sound wave interference and reinforcement along lines parallel to the normal NN. However, the optical effect on the light beam transmitted through this interference region is essentially the same as before described where two such beams did not actually pass through each other. Thus, there will be lines D, D, D of zero phase optical retardation separated by the distance $s$. Between lines D, D, D there will be a non-zero, oscillating phase retardation which will send light onto the screen of Fig. 1, thus giving dark and bright bands on the screen of spacing $s'=Ms$ where M is the magnification factor. Thus, the spacing $s$ can be determined, and as previously developed for crossed sound beams $\sin \varphi = \Lambda_1/2s$; where $\Lambda_1$ is the sound velocity in the liquid. From the refraction formula above $\sin \varphi = (\Lambda_1/\Lambda_T) \sin \theta$. Eliminating $\sin \varphi$ from these two equations gives $\Lambda_1/2s = (\Lambda_1/\Lambda_T) \sin \theta$, or $\Lambda_T = 2s \sin \theta$. Thus, if the spacing $s$ is measured (in terms of that visible on the screen $s'=Ms$), the equal angles $\theta$ of the prism are known, and the frequency $f = v_T/\Lambda_T$ is known, then the transverse velocity $v_T$ in the prism is simply given by $v_T = 2f \cdot s \cdot \sin \theta$, independently of the velocity $v_1$ in the liquid.

Certain characteristics of sound propagation through a boundary may be taken advantage of to improve the clarity of the band pattern or the accuracy in this method. For example, if the equal angles of the prism $\theta$ are made greater than the critical angle $\theta_0$ defined by $\sin \theta_0 = \sin \theta_T = (v_T/v_L) \sin (\theta_L = 90°) = v_T/v_L$, where $v_L$ is the longitudinal velocity in the prism, then no longitudinal beam will be generated in the prism. Since $v_T/v_L = \sqrt{1-2\sigma}/\sqrt{2-2\sigma}$ as before, and the Poisson's ratio $\sigma$ always has values greater than zero, $v_T/v_L$ is never greater than $\sqrt{1/2}$. Hence, the prism angle $\theta$ may in all cases have values from 90 degrees down to 45 degrees without danger of generating an interfering longitudinal wave. For many solid materials, $\sigma$ is greater than $\frac{1}{3}$, for which the prism may have angles in the range of 90 degrees to 30 degrees. As $\sigma$ approaches one-half, as for gels and liquids the prism angles may be reduced to even smaller values if desired. Thus, it is always possible to eliminate interfering longitudinal vibrations by keeping the prism angles $\theta$ large enough without their having in any case to be larger than 45 degrees. In the case of plastics, or other materials where $\sigma$ is greater than $\frac{1}{3}$, it is convenient to make $\theta = 30°$, whence the measurement formula reduces to $v_T = f \cdot s$.

Another factor of interest is the elastic resonance condition possible in an isosceles prism driver as shown. Except when there is perfect impedance match between the prism and the liquid (i. e. the density$\times$velocity product for one equals the same product for the other) there will be reflection of the transverse waves at the solid-water boundary. Further, the path length of all sound rays from A, through reflection, to B or vice versa are the same, as though the radiators were mounted opposite each other on opposite sides of a rhomb of acute angle $2\theta$ and altitude H given by $H=2h \cos \theta$, where $h$ is the altitude of the isosceles triangle. Thus, there can be resonance or antiresonance of the prism depending upon whether the frequency is adjusted so that the path length H equals an integral number of half sound wavelength $n\Lambda_T/2$, or is adjusted so that the path length equals $(n+1/2)\Lambda_T/2$, respectively. Near the antiresonant adjustment there will be a very weak sound field set up and the optical effects will be small. However, by a small adjustment of frequency, resonance will occur and with only small applied voltages a strong sound field and light pattern may be obtained. Since the path length H is usually so large compared to $\Lambda_T/2$ only a very small frequency adjustment is required to obtain resonance. In fact the shift is so small that usually a number of different resonances may be observed without shifting the frequency far enough from the natural resonant frequency of the radiators to cause them to be appreciably less active.

Especial advantage may be made of this resonance condition in this method. For, unless the prism material is very attenuating, or matches the liquid too closely as described in the following paragraph, the resonant conditions will be so good that one of the two radiators A and B above used may be eliminated. Thus, a single radiator, say B, generates a sound beam which is partially reflected from the bottom edge of the prism P, proceeds to the prism face A where it is totally reflected back on its original path to B again. At each reflection from the liquid-solid boundary some of the energy is lost by transmission into the water, giving the same two longitudinal sound beams in the water as before. Usually measurements may thus be made with a single radiator.

Another factor is the choice of liquid medium, for although its characteristics do not enter into the measurement formula, it may in some cases be chosen to advantage. The acoustic impedance of a material is given by the product of its density and its sound velocity, and it is the relation between the impedance of the liquid and that of the solid specimen that is of concern here. When two radiators are used on the prism it is of advantage that the two impedances be comparable so that little sound energy in the prism is reflected at the liquid-water boundary. When using a single radiator the impedances must be sufficiently unequal that good reflection is obtained at the liquid-solid boundary. There is always good reflection at the air-solid boundary because of the very great impedance mismatch between air and solid.

The above method for the measurement of the transverse sound velocity $v_T$ in an isosceles prism may also be applied to the measurement of the longitudinal velocity $v_L$. For if the radiators A and B of Figure 15-A are of the type that radiate longitudinal sound waves, for example X-cut quartz, then longitudinal sound beams will be propagated into the prism P and transmitted to the liquid A' and B' as before. The same angular relations hold as before using here $v_L$ instead of $v_T$ giving the final measurement formula $v_L = 2f \cdot s \cdot \sin \theta$. Also a single radiator may be used, as before, in some cases. However, since the longitudinal sound beams within the prism may generate transverse beams at the liquid-solid boundary for all angles of incidence, no choice of prism angle $\theta$ will eliminate interference entirely. However, for certain angles $\theta$ the interference will be less, and especially when the impedances of the solid and liquid can be made to approach a match the interference will be greatly reduced. Further, in some cases it may be possible to utilize a single radiator as before, but best conditions for use of a single longitudinal radiator are usually not the best for the elimination of interference.

Figure 16A:
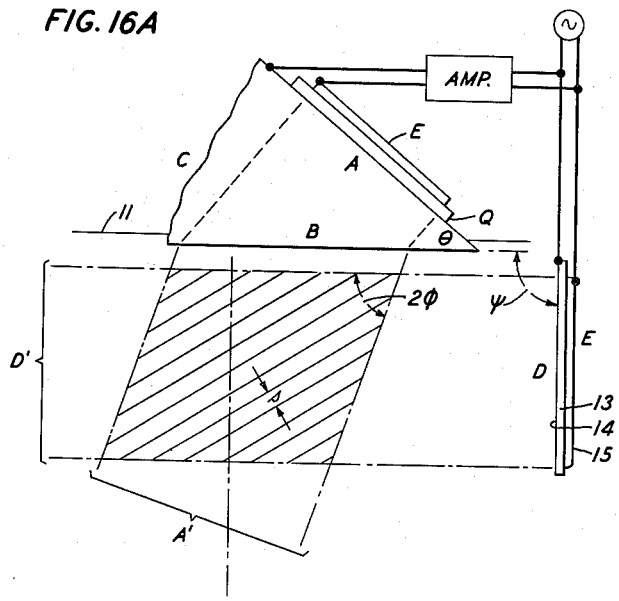
Fig. 16A is a schematic diagram of sound beams and patterns for a system which combines some of the features of previous figures.
Figure 16B:
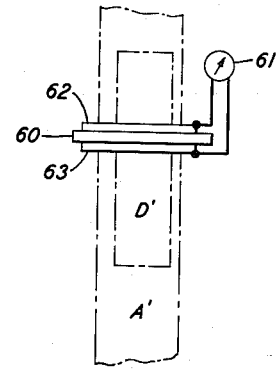
Figs. 16B and 16C are sectional representations of the beams of the system of Fig. 16A, for the case of superimposed sound beams and non-mingling sound beams, respectively.
Figure 16C:
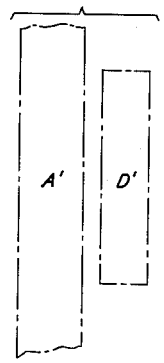

Various combinations of the several methods already outlined may be utilized to advantage as is easily seen. For example, as in Figs. 16-A, 16-B and 16-C a solid specimen with an either transverse or longitudinal radiator A mounted on one face may contact the liquid surface on another face B. The periphery C may be a flat face, or flat face backed with sound absorbing material, or a corrugated or non-flat surface to diffuse sound striking it. A longitudinal sound radiator D in contact with the liquid may be such a one as shown at 13, 14, 15 of Fig. 1. The two transmitted sound beams A' and B' may proceed through each other, as in Fig. 16-B, or proceed past each other, as in Fig. 16-C, if the two radiators A and D are displaced in the direction of the optic axis 17 of Fig. 1. In either case the optical effects in the region where the light rays go through both beams are as previously described, light and dark bands will appear on the screen and from their spacing measurement the spacing $s$ of the zero optical retardation lines may be determined. From this value of $s$ the angle between the forward directions of the two beams $2\varphi$ may be determined. Knowing the specimen angle $\theta$, the angle $\psi$ between the specimen face B and radiator D, and $\varphi$ or $s$, one may determine the velocity within the prism by use of the above developed theory. The radiators, while usually excited from the same electrical source in parallel in order to have the same frequency, may have different voltages applied to each, as by the insertion of an amplifier in one supply line as in Fig. 16-A. Phase shift by the amplifier is of no concern providing it stays constant with time. It is obvious that there are numerous other variations of method and apparatus. Certain variations will be of particular use for certain applications while others may be of more use in other cases.

Whereas in the foregoing explanations the formulae have been derived in the simplest manner for each specific case, it is often desirable to have general formulae which are applicable to as many specific cases as possible, and which likewise will be applicable to other arrangements than those shown as examples above. There is little use in generalizing on refraction formulae, which of course are similar to those for optics. However, a general formula for the interference band spacing $s$ produced in the region where two sound beams coexist, or where by optical means they coexist in effect, is of considerable use as has been seen in all the above examples. In fact it is often desirable merely to measure the angle $2\varphi$ between two sound beams which may pass through each other, or by each other without actually interfering acoustically. In the latter case the two beams may actually exist in different media. The following general formula is given for the purposes above mentioned.

Figure 17:
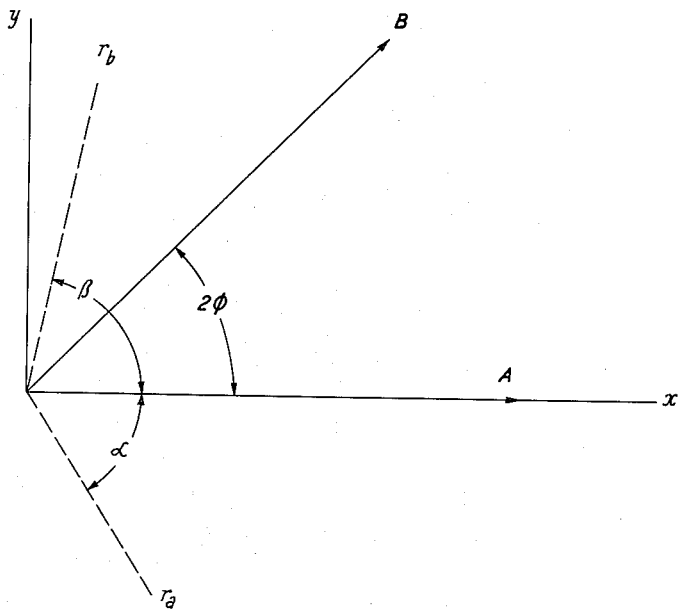
Fig. 17 is a diagram useful in deriving a generalized formula for the angle between two beams one or both of which has been refracted.

Let two longitudinal sound beams A and B be traveling through space without intersecting, the A beam having the velocity $v_1$ and the B beam the velocity $v_2$. Let us choose rectangular reference axis $x$, $y$, $z$ such that the $xy$-plane is parallel to both beams and the $z$-axis is normal to both beams. Let the A beam be coincident with the $x$-axis as in Fig. 17, and let the projection of the B beam on the $xy$-plane be inclined to the A beam by the angle $2\varphi$. In case it is desired to measure the angle $2\varphi$ by optical means as before described the optical axis is parallel to the $x$-axis. Let $p_{10} = w_1 \Delta \mu_1 / \lambda$ and $p_{20} = w_2 \Delta \mu_2 / \lambda$ be the optical phase retardation amplitudes for the A and B beams respectively. Then these two traveling beams will have a total phase retardation $p$ given as a function of location $x$ and $y$ and time $t$ by $p = p_{10} + p_{20}$ or $$p = p_{10} e^{i[\omega t - k_1 x]} + p_{20} e^{i[\omega t - k_2(x \cos 2\varphi + y \sin 2\varphi)]}$$

where $k_1 = 2\pi f / v_1$, $k_2 = 2\pi f / v_2$, $\omega = 2\pi f$. Let us assume, as before, that the individual beam intensities or widths $w_1$ and $w_2$ as measured in the $z$-direction are adjusted so that $p_{10} = p_{20} = p_0$. The two terms of $p$ are simply additive giving.

$$p = 2p_0 \cos\left[\left(\frac{k_1}{2} - \frac{k_2}{2} \cos 2\varphi\right)x - \left(\frac{k_2}{2} \sin 2\varphi\right)y\right]$$

$$e^{i\left(\omega t - \left[\left(\frac{k_1}{2} + \frac{k_2}{2} \cos 2\varphi\right)x + \left(\frac{k_2}{2} \sin 2\varphi\right)y\right]\right)}$$

Or taking the real part of $p$, the form may be simplified to $$|p| = 2p_0 \cos(ar_a) \cos(\omega t - br_b)$$

where $a$ and $b$ are each functions of $k_1$, $k_2$ and $2\varphi$, and $r_a$ and $r_b$ are coordinates measured in the directions $\alpha$ and $\beta$ from the $x$-axis, respectively, as shown in the figure. The quantities $a$, $b$, $\alpha$ and $\beta$ are obtained from the substitutions that have been made, as $a \cdot \cos \alpha = (k_1 - k_2 \cos 2\varphi)/2$ and $a \cdot \sin \alpha = -(k_2 \sin 2\varphi)/2$
$b \cdot \cos \beta = (k_1 + k_2 \cos 2\varphi)/2$ and $b \cdot \sin \beta = (k_2 \sin 2\varphi)/2$ solving for $a$, $b$, and $\tan \alpha$ and $\tan \beta$, after substituting $k_1 = 2\pi f / v_1$ and $k_2 = 2\pi f / v_2$ gives $$a = \pi f \left[\frac{1}{v_1^2} + \frac{1}{v_2^2} - \frac{2 \cos 2\varphi}{v_1 v_2}\right]^{\frac{1}{2}}$$

$$b = \pi f \left[ \frac{1}{v_1^2} + \frac{1}{v_2^2} + \frac{2\cos 2\varphi}{v_1 v_2} \right]^{\frac{1}{2}}$$

$$\tan \alpha = \frac{-\sin 2\varphi}{\frac{v_2}{v_1} - \cos 2\varphi}$$

and $$\tan \beta = \frac{\sin 2\varphi}{\frac{v_2}{v_1} + \cos 2\varphi}$$

Now returning to the formula for $|p|$, we are mainly interested as before in interference bands which occur when $|p| =$ zero for all time $t$, which condition is obtained when $\cos(ar_a) =$ zero or when $r_a = (\pi/2 + n\pi)/a$. The separation $s$ of these bands, as measured along the direction $r_a$ inclined at an angle $\alpha$ to the x-axis, is given by $$s = [r_a]_n - [r_a]_{n-1} = \pi/a$$

or substituting the expression for $a$, $$\frac{1}{f \cdot s} = \sqrt{\frac{1}{v_1^2} + \frac{1}{v_2^2} - \frac{2\cos 2\varphi}{v_1 v_2}}$$

This formula may be used to measure the angle $2\varphi$ between two beams in terms of their respective velocities $v_1$ and $v_2$, the frequency $f$, and the band spacing $s$. The direction in which $s$ is measured, said direction being normal to the interference bands, is the direction of the $r_a$-coordinate whose inclination to the x-axis is given by the above formula for the $\alpha$.

As a specfic example of the use of this formula let us take the above commonly used cases wherein $v_2 = v_1$, both beams in the liquid medium, then $1/fs$ reduces to $$\frac{1}{f \cdot s} = \frac{2 \sin \varphi}{v_1}$$

or $$\sin \varphi = \frac{v_1}{2fs}$$

as before, and $$\tan \alpha = -\cot \varphi = \tan(\varphi - 90°) \text{ or } \alpha = \varphi - 90°$$

thus the formula for $\sin \varphi$ is as previously given and $s$ is measured in the direction $r_a$ which is inclined to the x-axis by the angle $\alpha = \varphi - 90°$, which is normal to the direction bisecting the original beam directions A and B, as before. Similarly the previous formula for the specific case of Figs. 13-A and 13-B may be derived by substituting for $2\varphi$ the angle $$2\varphi = i - r = i - \sin^{-1}\left(\frac{v_1}{v_2} \sin i\right)$$

Whereas, in the foregoing, the optical method has been used to detect zero optical retardation bands, other systems may also be used. For example, in a setup without an optical system, one may use a long thin piezoelectric probing element 60, held with its length parallel to the above-described optical axis direction, as in Fig. 16-B, and moved about in a direction normal to the optical axis to detect directly in a connected electric indicator 61 the spacings of the bands of zero acoustical retardation, which are coincident with the former. The indicator 61 is connected between a pair of electrodes 62, 63 mounted upon opposite faces of the element 60.

What is claimed is:

1. A device for measuring the speed of mechanical vibrational waves in an opaque solid material, comprising a tank containing a transparent liquid of known propagational velocity for the said waves, means supported by the tank to transmit a beam of said waves into the liquid, said solid material having the configuration of a prism and being at least partially immersed in said liquid, the prism being positioned in the beam whereby the beam is split up into two parallel paths, one through the prism and the other through the liquid, the said path through the prism passing out of the prism through a surface thereof inclined to the direction of the incident beam at an angle materially different from 90 degrees, and integrating means coupled to the liquid medium to indicate a pattern which is dependent upon the presence of divergent beams in the liquid.

2. A device for comparing wave propagational velocities of mechanical vibrations in various materials one of which has a known propagational velocity for said vibrations comprising a body of transparent material, means to transmit wave energy of said vibrations of known frequency in substantially plane waves through a portion of said transparent material, the material to be compared having the configuration of a prism with a dihedral angle $\theta_1$ and being enveloped, at least partially by said transparent material, said prism being oriented with one face of the said dihedral angle inclined at an angle $\theta_2$ to the plane of said waves, said prism being in the path of said waves whereby some of said waves are refracted by the prism and some remain unrefracted in the transparent material, and integrating means coupled to the transparent material in a portion of said transparent material containing both unrefracted waves and waves refracted by passage through said prism to indicate a wave pattern whereby the wave propagational velocities in the respective materials are correlated with the angles $\theta_1$ and $\theta_2$ and the known velocity in one of the materials.

3. A device for measuring wave propagational velocities of mechanical vibrations in matter, comprising a body of transparent substance of known or standard wave propagational velocity substantially enclosing a body of substance to be measured, said respective bodies being in operatively coupled relation for the interchange of wave energy therebetween, means to transmit a beam of wave energy into the transparent body, the body to be measured being positioned in the path of the beam whereby the beam is split into two beams in parallel paths, the first of said paths passing through said transparent substance and the second of said paths passing through said substance to be measured and thence into said transparent substance, the said second path entering the transparent substance through a dividing interface which is inclined to the direction of propagation of the waves incident thereupon by an angle materially different from 90 degrees, said paths being separate and non-intersecting, and an ultrasonic light-diffraction system having its light beam passing through a portion of the volume of said transparent substance common to both paths.

4. A device for measuring the speed of mechanical vibration waves, comprising a tank of water for which the speed of said waves is known and in which a specimen to be measured has a plane surface immersed, means adapted to transmit a beam of said waves of known frequency through the water, the specimen being positioned in the beam whereby the beam is split into two beams one passing through the water in the vicinity of the specimen and the second passing through portions of both the specimen and the water and passing through the said immersed surface from the specimen to the water, said surface being inclined to the direction of the sound energy incident thereon at an angle materially different from 90 degrees, and integrating means coupled to the water in a region including both said paths to indicate a wave pattern due to said waves in said first and second paths.

5. A device for measuring wave propagational velocities of mechanical vibrations in matter comprising a body of a reference substance having a known propagational velocity for the waves to be employed, and substantially surrounding a body of a substance to be measured, said bodies having a plane interface over which they are coupled for the interchange of wave energy therebetween, means so constructed and arranged as to supply a beam of mechanical vibrational energy of known frequency to said body of reference substance, the body to be measured being positioned in said beam to divide said energy into a pair of beams, one of said beams passing through said interface and the other remaining in said reference substance, said two beams being adjacent to each other but separate and non-intersecting in a region of said one beam further from the source than the point where it passes through the interface, and integrating means positioned in the said last-mentioned region to indicate a wave pattern due to the simultaneous existence of mechanical vibrations in both of said beams.

6. A device for measuring wave propagational velocities of mechanical vibrations in matter, comprising a body of a reference substance having a known propagational velocity for the waves to be employed and substantially enclosing a body of a substance to be measured, said bodies having a plane interface over which they are coupled for the interchange of wave energy therebetween, means to couple a source of mechanical vibrational energy to said system of coupled bodies, said means being so constructed and arranged with respect to said bodies as to determine a beam of known frequency over which energy from said source is transmitted into the reference substance, the body to be measured being positioned in the path of the beam thereby dividing the beam into two beams one of said two last-mentioned beams passing through said interface and the other remaining in the reference substance, said two beams being adjacent to each other but separate and non-intersecting in a region of said one beam further from the source than the point where it passes through the interface and integrating means positioned in the said last-mentioned region to indicate a wave pattern due to the simultaneous existence of mechanical vibrations in both of said beams.

7. A device for measuring wave propagational velocities of mechanical vibrations in matter, comprising a body of reference substance of known propagational velocity substantially enclosing a body of substance to be measured, said respective bodies having an interface over which said substances are coupled for the interchange of wave energy therebetween, means to transmit wave energy into the reference substance, a body of the substance to be measured being positioned in the path of said wave energy whereby the energy is divided into two beams in parallel paths, the first of said paths passing through the reference substance in the vicinity of the substance to be measured and the second of said paths including portions of both substances and passing through the said interface, said interface being inclined to the direction of propagation of the wave energy incident thereon at an angle materially different from 90 degrees, and integrating means positioned in both said paths to indicate a wave pattern due to waves in said paths.

8. A device in accordance with claim 3, in which the said interface is plane and in which there are two additional interfaces between the respective volumes of substances, said two additional interfaces being optical surfaces parallel to each other and perpendicular to the first-mentioned interface, the said light diffraction system having its light beam directed perpendicularly through said two additional interfaces.

9. A device in accordance with claim 5, in which both the reference substance and the substance to be measured are transparent and in which the means to indicate a pattern of interference comprises optical beam means in which the path of the optical beam passes through a portion of the said one beam of mechanical vibrational energy which is confined to the substance to be measured and through a portion of said other beam of mechanical vibrational energy which is adjacent to said portion of the said one beam of mechanical vibrational energy.

10. A device for comparing wave propagational velocities of mechanical vibrations in different materials one of which is transparent and the other of which is opaque and one of which has a known propagational velocity, the opaque material being in the form of a body having at least two plane mechanical faces forming a dihedral angle therebetween and being substantially surrounded by said transparent material, means adapted to project a beam of mechanical vibrations of known frequency into the transparent material, said opaque body being positioned in the path of the beam thereby splitting the beam into two beams one of which passes from the specimen to the surrounding material through one of said plane mechanical faces and the other of which lies entirely in the surrounding material, and optical integrating means coupled to both beams to indicate a wave pattern in a portion of said transparent material due to waves in both said beams.

11. A device for comparing propagational velocities of mechanical vibrations in first and second bodies of different media, said first body substantially surrounding said second body, and one of said media having a known propagational velocity for the waves to be employed, said bodies having a plane interface over which they are coupled for the interchange of wave energy therebetween, said device comprising, means so constructed and arranged as to supply a beam of mechanical vibrational energy of known frequency to said first body, said second body being positioned in said beam to divide said energy into a pair of beams, one of said beams passing through said interface and the other remaining in said first body, said two beams being adjacent to each other but separate and nonintersecting in a region of said one beam further from the source than the point where it passes through the interface, and integrating means actuated by vibrational energy in both said beams developing a wave interference type of pattern due to the simultaneous existence of mechanical vibrations in both of said beams.

12. A device in accordance with claim 11 in which one of the media is fluid.

13. A device in accordance with claim 11 in which one of the media is water.

14. A device in accordance with claim 11 in which the medium of known propagational velocity is water.

15. A device in accordance with claim 11 in which one of the media is transparent.

16. A device in accordance with claim 15 in which the said integrating means comprises an optical system.

17. A device in accordance with claim 11 in which one of the media is opaque.

18. A device in accordance with claim 11 in which both media are transparent.

19. A device in accordance with claim 11 in which the said integrating means comprises an optical system responsive to variations in the density of a medium such as result from the passage of mechanical vibrational waves through the medium.

20. A device in accordance with claim 11 in which the said integrating means comprises an ultrasonic light-diffraction system.

21. A device in accordance with claim 11 in which the said integrating means comprises a piezoelectric probing element.

References Cited in the file of this patent

UNITED STATES PATENTS

| | | |
|---|---|---|
| 2,308,360 | Fair | Jan. 12, 1943 |
| 2,461,543 | Gunn | Feb. 15, 1949 |

OTHER REFERENCES

Journal of Applied Physics, vol. 20, No. 3, March 1949, pp. 286–294.

Ultrasonics, B. Carlin, McGraw-Hill, April 8, 1949, pp. 140 and 141.

Germany, Physikalische Zeitschrift, 36, 1935, pp. 142–145.